United States Patent
Choi et al.

(10) Patent No.: US 12,408,151 B2
(45) Date of Patent: Sep. 2, 2025

(54) METHOD AND APPARATUS OF INITIAL ACCESS FOR USER EQUIPMENT WITH REDUCED COMPLEXITY IN WIRELESS COMMUNICATION SYSTEM

(71) Applicant: Samsung Electronics Co., Ltd., Suwon-si (KR)

(72) Inventors: Seunghoon Choi, Suwon-si (KR); Youngbum Kim, Suwon-si (KR); Hyunseok Ryu, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 348 days.

(21) Appl. No.: 17/821,369

(22) Filed: Aug. 22, 2022

(65) Prior Publication Data

US 2023/0074797 A1 Mar. 9, 2023

(30) Foreign Application Priority Data

Aug. 23, 2021 (KR) .................. 10-2021-0111085
Sep. 16, 2021 (KR) .................. 10-2021-0124214

(51) Int. Cl.
*H04W 72/04* (2023.01)
*H04L 5/00* (2006.01)
(Continued)

(52) U.S. Cl.
CPC ......... *H04W 72/044* (2013.01); *H04L 5/0094* (2013.01); *H04W 56/001* (2013.01); *H04W 72/23* (2023.01)

(58) Field of Classification Search
CPC ............... H04W 72/044; H04W 72/23; H04W 72/0453; H04W 56/001; H04W 48/12;
(Continued)

(56) References Cited

U.S. PATENT DOCUMENTS

2021/0037603 A1 2/2021 Li et al.
2021/0195654 A1 6/2021 Lei et al.
(Continued)

FOREIGN PATENT DOCUMENTS

KR 10-2022-0022831 A 2/2022
WO 2021147580 A1 7/2021
WO 2021155495 A1 8/2021

OTHER PUBLICATIONS

3GPP TR 38.822 V15.0.1 (Jul. 2019), Technical Report, 3rd Generation Partnership Project; Technical Specification Group Radio Access Network; NR; User Equipment (UE) feature list (Release 15), Jul. 2019, 4 pages.
(Continued)

*Primary Examiner* — Candal Elpenord

(57) ABSTRACT

The disclosure relates to a 5G or 6G communication system for supporting a higher data transfer rate than a 4G communication system such as LTE. The disclosure proposes a method and an apparatus for initial access of a reduced capability terminal. The method comprises receiving, from a base station, information on an initial bandwidth part (BWP) for the redcap terminal; and transmitting and receiving, to or from the base station, data on the initial BWP for the redcap terminal, wherein the information on the initial BWP for the redcap terminal is included in a system information block 1, and wherein the information on the initial BWP for the redcap terminal includes information on a frequency location of the initial BWP for the redcap terminal, subcarrier spacing information and cyclic prefix information of the initial BWP for the redcap terminal.

20 Claims, 11 Drawing Sheets

(51) Int. Cl.
  *H04W 56/00* (2009.01)
  *H04W 72/044* (2023.01)
  *H04W 72/23* (2023.01)

(58) Field of Classification Search
  CPC ... H04L 5/0094; H04L 5/0039; H04L 5/0044; H04L 5/0092
  USPC .................................................. 370/329–330
  See application file for complete search history.

(56) References Cited

U.S. PATENT DOCUMENTS

| | | | |
|---|---|---|---|
| 2022/0061098 A1 | 2/2022 | Choi et al. | |
| 2023/0038753 A1* | 2/2023 | Tan | H04W 74/0841 |
| 2023/0047726 A1* | 2/2023 | Xu | H04W 72/20 |
| 2023/0180199 A1* | 6/2023 | Jung | H04L 1/0038 370/329 |
| 2024/0276530 A1* | 8/2024 | Lee | H04L 5/00 |

OTHER PUBLICATIONS

3GPP TS 38.331 V16.5.0 (Jun. 2021), Technical Specification, 3rd Generation Partnership Project; Technical Specification Group Radio Access Network; NR; Radio Resource Control (RRC) protocol specification (Release 16), Jun. 2021, 959 pages.
International Search Report and Written Opinion of the International Searching Authority dated Nov. 24, 2022, in connection with International Application No. PCT/KR2022/012537, 7 pages.
Ericsson, "Reduced maximum UE bandwidth for RedCap," R1-2106563, 3GPP TSG-RAN WG1 Meeting #106-e, e-Meeting, Aug. 16-27, 2021, 21 pages.
Nokia et al., "UE Complexity Reduction Aspects Related to Reduced Maximum UE Bandwidth," R1-2106648, 3GPP TSG RAN WG1 Meeting #106-e, e-Meeting, Aug. 16-27, 2021, 9 pages.
Vivo, et al., "Discussion on reduced maximum UE bandwidth," R1-2106601, 3GPP TSG RAN WG1 Meeting #106-e, e-Meeting, Aug. 16-27, 2021, 9 pages.
Supplementary European Search Report dated Mar. 2, 2023, in connection with European Application No. 22822255.0, 12 pages.
Samsung, "Supported bandwidth of RedCap UEs," R2-2100208, 3GPP TSG-RAN WG2 Meeting #113-E, Online, Jan. 25-Feb. 5, 2021, 2 pages.
ZTE, et al., "Higher layer support of Reduced Capability NR devices," R1-2106845, 3GPP TSG RAN WG1 #106-e, e-Meeting, Aug. 16-27, 2021, 6 pages.

* cited by examiner

METHOD AND APPARATUS OF INITIAL ACCESS FOR USER EQUIPMENT WITH REDUCED COMPLEXITY IN WIRELESS COMMUNICATION SYSTEM

CROSS-REFERENCE TO RELATED APPLICATIONS

This application is based on and claims priority under 35 U.S.C. § 119 to Korean Patent Application Nos. 10-2021-0111085 and 10-2021-0124214, filed on Aug. 23, 2021, Sep. 16, 2021, in the Korean Intellectual Property Office, the disclosures of which are herein incorporated by reference in their entirety.

BACKGROUND

1. Field

The disclosure relates to a communication method and apparatus for a reduced capability terminal in a wireless communication system and, specifically, to a method and an apparatus for initial access of a reduced capability terminal.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Furthermore, in 3GPP, for support of a technology, such as sensors, surveillance cameras, and smart watches, discussion about an NR reduced capability (RedCap) terminal standard enabling the terminal to have reduced complexity (capability) and to access a 5G communication system and transmit or receive data has been started.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method and an apparatus for initial access of a reduced capability terminal.

The present disclosure has been made to address the above-mentioned problems and disadvantages, and to provide at least the advantages described below.

In accordance with an aspect of the present disclosure, a method performed by a reduced capability (redcap) terminal in a communication system is provided. The method includes receiving, from a base station, information on an initial bandwidth part (BWP) for the redcap terminal; and transmitting and receiving, to or from the base station, data on the initial BWP for the redcap terminal, wherein the information on the initial BWP for the redcap terminal is included in a system information block 1, and wherein the information on the initial BWP for the redcap terminal includes information on a frequency location of the initial BWP for the redcap terminal, subcarrier spacing information and cyclic prefix information of the initial BWP for the redcap terminal.

In accordance with another aspect of the present disclosure, a method performed by a base station supporting a reduced capability (redcap) terminal in a communication system is provided. The method includes transmitting, to the redcap terminal, information on an initial bandwidth part (BWP) for the redcap terminal; and transmitting and receiving, to or from the redcap terminal, data on the initial BWP for the redcap terminal, wherein the information on the initial BWP for the redcap terminal is included in a system information block 1, and wherein the information on the initial BWP for the redcap terminal includes information on a frequency location of the initial BWP for the redcap terminal, subcarrier spacing information and cyclic prefix information of the initial BWP for the redcap terminal.

In accordance with another aspect of the present disclosure, a reduced capability (redcap) terminal in a communication system is provided. The redcap terminal includes a transceiver and a controller coupled with the transceiver and configured to: receive, from a base station, information on an initial bandwidth part (BWP) for the redcap terminal, and transmit and receive, to or from the base station, data on the initial BWP for the redcap terminal, wherein the information on the initial BWP for the redcap terminal is included in a system information block 1, and wherein the information on the initial BWP for the redcap terminal includes information on a frequency location of the initial BWP for the redcap terminal, subcarrier spacing information and cyclic prefix information of the initial BWP for the redcap terminal.

In accordance with another aspect of the present disclosure, a base station supporting a reduced capability (redcap) terminal in a communication system is provided. The base station includes a transceiver and a controller coupled with the transceiver and configured to: transmit, to the redcap terminal, information on an initial bandwidth part (BWP) for the redcap terminal, and transmit and receive, to or from the redcap terminal, data on the initial BWP for the redcap terminal, wherein the information on the initial BWP for the redcap terminal is included in a system information block 1, and wherein the information on the initial BWP for the redcap terminal includes information on a frequency location of the initial BWP for the redcap terminal, subcarrier spacing information and cyclic prefix information of the initial BWP for the redcap terminal.

According to the disclosure, a reduced capability terminal and a non-reduced capability terminal may efficiently share and use resources, and a reduced capability terminal may effectively perform initial access.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
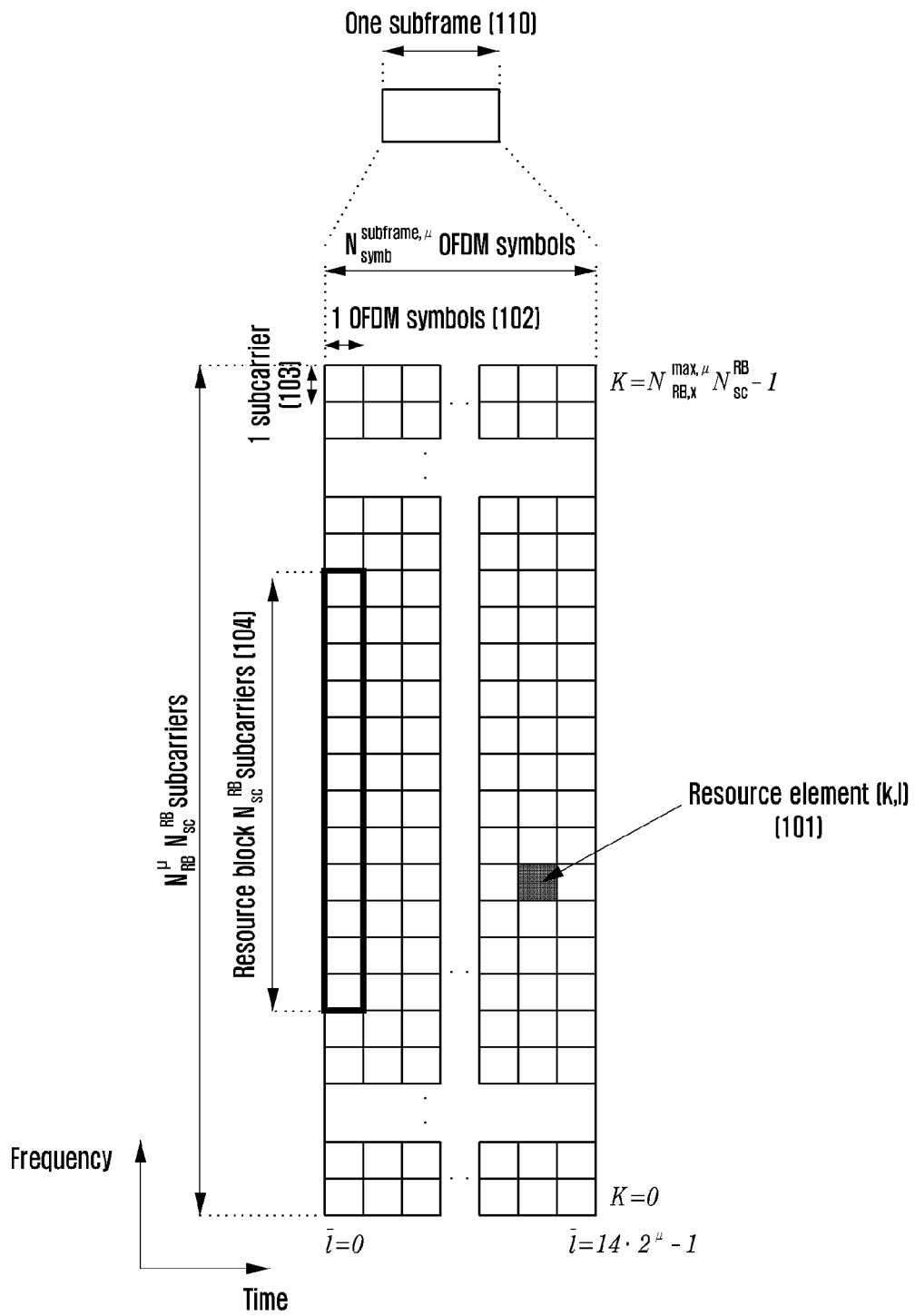
FIG. 1 illustrates a basic structure of a time-frequency domain that is a wireless resource region in a wireless communication system according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE, LTE-A, or 5G systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used in embodiments of the disclosure, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, embodiments will be described in detail with reference to the accompanying drawings. Hereinafter, a method and an apparatus provided in embodiments describe the embodiments with an IoT service (IWSN, surveillance camera, or wearable-related) as an example, but are not applied limitedly to each embodiment. It may also be possible to use a combination of all or some of one or more embodiments provided in the disclosure, in a downlink reception and uplink transmission method corresponding to a different additional service. Therefore, embodiments may be applied through partial modification without departing from the scope of the disclosure through determination by those skilled in the art (i.e., those of ordinary skill).

Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a terminal transmits data or control signals to a base station, and the downlink indicates a radio link through which the base station transmits data or control signals to the terminal. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, may freely reflect various requirements of users, service providers, and the like, services satisfying various requirements may be supported. The services considered in the 5G communication system include enhanced mobile broadband (eMBB) communication, massive machine-type communication (mMTC), ultra-reliability low-latency communication (URLLC), and the like.

eMBB aims at providing a data rate higher than that supported by existing LTE, LTE-A, or LTE-Pro. For example, in the 5G communication system, eMBB may provide a peak data rate of 20 Gbps in the downlink and a peak data rate of 10 Gbps in the uplink for a single base station. Furthermore, the 5G communication system may provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, the Internet of Things may support a large number of UEs (e.g., 1,000, 000 UEs/km$^2$) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC may be configured to be inexpensive, and may require a very long battery life-time, such as 10 to 15 years, because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC may provide communication with ultra-low latency and ultra-high reliability. For example, a service supporting URLLC may satisfy an air interface latency of less than 0.5 ms, and also requires a packet error rate of $10^{-5}$ or less. Therefore, for the services supporting URLLC, a 5G system may provide a transmit time interval (TTI) shorter than those of other services, and may assign a large number of resources in a frequency band in order to secure reliability of a communication link.

Three services in the 5G communication system (hereinafter, may be interchangeably used with "5G system"), that is, eMBB, URLLC, and mMTC, may be multiplexed and transmitted in a single system. In this case, different transmission/reception techniques and transmission/reception parameters may be used between services in order to satisfy different requirements of the respective services.

Hereinafter, a frame structure of a 5G system will be described in detail with reference to the drawings. In the following description, a wireless communication system to which the disclosure is applied will be described with a configuration of a 5G system as an example for convenience of explanation, but embodiments may also be applied to a 5G or beyond system or a different communication system to which the disclosure is applicable, in the same or similar way.

FIG. 1 illustrates a basic structure of a time-frequency domain that is a wireless resource region in a wireless communication system according to various embodiments of the present disclosure.

In FIG. 1, the transverse axis indicates a time domain, and the longitudinal axis indicates a frequency domain. A basic unit of the resources in the time-frequency domain is a resource element (RE) 101, and may be defined by one orthogonal frequency division multiplexing (OFDM) symbol 102 (or a discrete Fourier transform spread OFDM (DFT-s-OFDM) symbol) in the time axis and one subcarrier 103 in the frequency axis. In the frequency domain, $N_{sc}^{RB}$ number (e.g., 12) of consecutive REs, which indicates the number of subcarriers per resource block (RB), may configure one resource block (RB) 104. In addition, in the time domain, $N_{symb}^{subframe}$ number of consecutive OFDM symbols, which indicates the number of symbols per subframe, may configure one subframe 110. For a more detailed description of a resource structure in a 5G system, a TS 38.211 section 4 protocol may be referred to.

Figure 2:
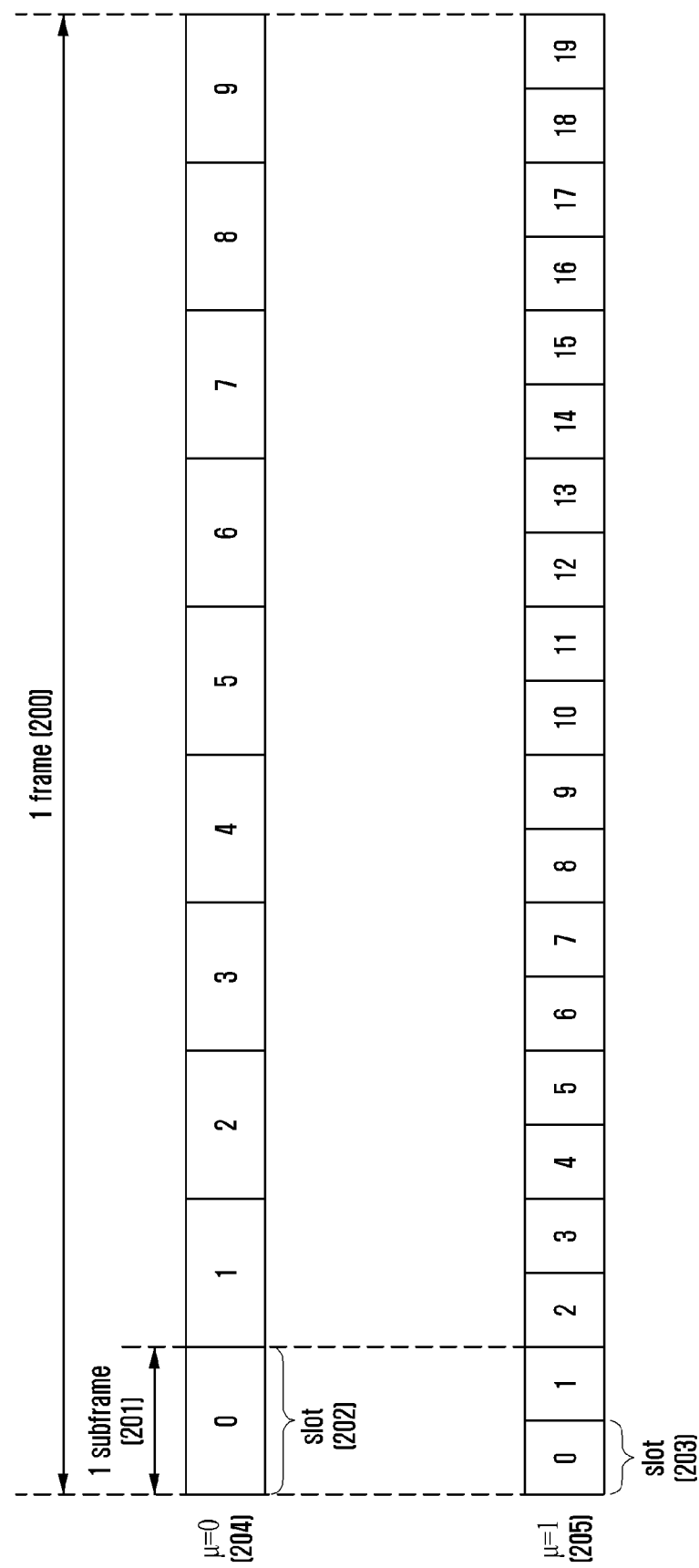
FIG. 2 illustrates a slot structure considered in a wireless communication system according to various embodiments of the present disclosure.

FIG. 2 illustrates a slot structure considered in a wireless communication system according to various embodiments of the present disclosure.

In FIG. 2, an example of a structure of a frame 200, a subframe 201, and a slot 202 is illustrated. The one frame 200 may be defined as 10 ms. The one subframe 201 may be defined as 1 ms, and thus the one frame 200 may be configured by a total of 10 subframes 201. Furthermore, the one slot 202 or 203 may be defined as 14 OFDM symbols (i.e., the number ($N_{symb}^{slot}$) of symbols per one slot=14). The one subframe 201 may be configured by the one slot 202 or multiple slots 203, and the number of slots 202 or 203 per one subframe 201 may vary according to a configuration value μ 204 or 205 of subcarrier spacing.

In the example of FIG. 2, respective slot structures of a case of μ=0 (204) and a case of μ=1 (205) are illustrated as a subcarrier spacing configuration value. In the case of μ=0 (204), the one subframe 201 may be configured by the one slot 202, and in the case of μ=1 (205), the one subframe 201 may be configured by two slots 203. That is, the number ($N_{slot}^{subframe,\mu}$) of slots per one subframe may vary according to a configuration value μ of a subcarrier spacing, and the number ($N_{slot}^{frame,\mu}$) of slots per one frame may vary accordingly. $N_{slot}^{subframe,\mu}$ and $N_{slot}^{frame,\mu}$ according to each subcarrier spacing configuration μ may be defined as shown below in table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In a 5G wireless communication system, a synchronization signal block (this may be used together with an SSB, an SS block, an SS/PBCH block, etc.) may be transmitted for initial access of a terminal, and the synchronization signal block may include a primary synchronization signal (PSS), a secondary synchronization signal (SSS), and a physical broadcast channel (PBCH). In an initial access stage at which a terminal accesses a system, the terminal first obtains downlink time and frequency domain synchronization from a synchronization signal through a cell search, and obtains a cell ID. The synchronization signal includes a PSS and an SSS.

The terminal receives a PBCH transmitting a master information block (MIB) from a base station, and obtains a basic parameter value and transmission/reception related system information, such as a system bandwidth or relevant control information. Based on this information, the terminal may decode a physical downlink control channel (PDCCH) and a physical downlink shared channel (PDSCH) to obtain a system information block (SIB). Thereafter, the terminal may exchange identification-related information on the terminal with the base station through a random access stage, and initially access a network through registration and authentication stages.

Hereinafter, a procedure for an operation of initial access to a cell in a 5G wireless communication system will be described in detail with reference to the drawings.

A synchronization signal is a signal serving as a criterion of a cell search, and a subcarrier spacing suitable for a channel environment, such as a phase noise, for each frequency band is applied to a synchronization signal to be transmitted. A 5G base station may transmit multiple synchronization signal blocks according to the number of analog beams to be managed. For example, a PSS and an SSS may be mapped and transmitted over 12 RBs, and a PBCH may be mapped and transmitted over 24 RBs. A structure in which a synchronization signal and a PBCH are transmitted in a 5G communication system will be described below.

Figure 3:
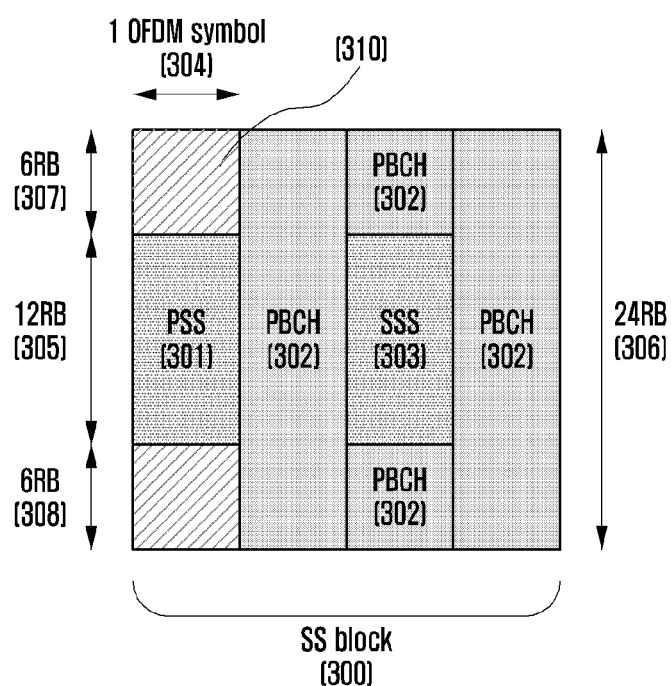
FIG. 3 illustrates a synchronization signal block considered in a wireless communication system according to various embodiments of the present disclosure.

FIG. 3 illustrates a synchronization signal block considered in a wireless communication system according to various embodiments of the present disclosure.

According to FIG. 3, a synchronization signal block (SS block) 300 is configured by a PSS 301, an SSS 303, a PBCH (a broadcast channel) 302.

As illustrated in FIG. 3, the synchronization signal block 300 is mapped to four OFDM symbols 304 on the time axis. The PSS 301 and the SSS 303 may be transmitted on 12 RBs 305 on the frequency axis and on the first and third OFDM symbols on the time axis, respectively. In a 5G system, for example, a total of 1008 different cell IDs may be defined, the PSS 301 may have three different values according to a physical layer ID of a cell, and the SSS 303 may have 336 different values. A terminal may obtain one of the 1008 (=336×3) cell IDs through detection of the PSS 301 and the SSS 303, and a combination thereof. This may be expressed by Equation 1 below.

$$N_{ID}^{cell} = 3N_{ID}^{(1)} + N_{ID}^{(2)} \qquad \text{[Equation 1]}$$

Here, $N_{ID}^{(1)}$ may be estimated from the SSS 303, and has a value of 0 to 335. $N_{ID}^{(2)}$ may be estimated from the PSS 301, and has a value of 0 to 2. The terminal may estimate a value of $N_{ID}^{cell}$, which is a cell ID, by using a combination of $N_{ID}^{(1)}$ and $N_{ID}^{(2)}$.

The PBCH 302 may be transmitted on a resource including opposite 6 RBs 307 and 308 and remaining after excluding middle 12 RBs, on which the SSS 303 is transmitted, from the second to fourth OFDM symbols of the SS block on the time axis and 24 RBs 306 on the frequency axis. Various pieces of system information, which are called an MIB, may be transmitted through the PBCH 302 and, more specifically, the MIB may include information as shown in Table 2 below, and a PBCH payload and a PBCH demodulation reference signal (DMRS) include additional information below. For a more detailed description of an MIB in a 5G system, a TS 38.331 protocol may be referred to.

TABLE 2

```
MIB ::=                   SEQUENCE {
    systemFrameNumber           BIT STRING (SIZE (6)),
    subCarrierSpacingCommon     ENUMERATED {scs15or60,
                                    scs30or120},
    ssb-SubcarrierOffset        INTEGER (0..15),
    dmrs-TypeA-Position         ENUMERATED {pos2, pos3},
    pdcch-ConfigSIB1            PDCCH-ConfigSIB1,
    cellBarred                  ENUMERATED {barred, notBarred},
    intraFreqReselection        ENUMERATED {allowed,
                                    notAllowed},
    spare                       BIT STRING (SIZE (1))
}
```

Synchronization signal block information: A frequency domain offset of a synchronization signal block is indicated through four bits (ssb-SubcarrierOffset) in an MIB. An index of a synchronization signal block including the PBCH may be indirectly obtained through decoding a PBCH DMRS and the PBCH. More specifically, in a frequency band of 6 GHz or lower, three bits obtained through decoding of a PBCH DMRS may indicate a synchronization signal block index, and in a frequency band of 6 GHz or higher, a total of six bits including three bits obtained through decoding of a PBCH DMRS and three bits included in a PBCH payload and obtained through PBCH decoding may indicate an index of a synchronization signal block including a PBCH.

Physical downlink control channel (PDCCH) information: A subcarrier spacing of a common downlink control channel is indicated through one bit (subCarrierSpacingCommon) in an MIB, and time-frequency resource configuration information on a control resource set (CORESET) and a search space (SS) having an identity (ID) of 0 is indicated through eight bits (pdcch-ConfigSIB1). The CORESET having an identity of 0 may be called controlResourceSetZero, and the search space having an identity of 0 may be called searchspaceZero. In the disclosure, the CORESET having an identity of 0 will be referred to as a CORESET #0 or a control resource set #0 for convenience, and the search space having an identity of 0 will be referred to as a search space #0 for convenience. A frequency resource indicating the number of RBs of a CORESET #0 including a common search space set of a Type0-PDCCH CSS set and a time resource indicating the number of OFDM symbols may be configured for a terminal through the pdcch-ConfigSIB1 during an initial cell access.

System frame number (SFN): Six bits (systemFrameNumber) in an MIB are used to indicate a part of an SFN. Four least significant bits (LSBs) of an SFN are included in a PBCH payload, and thus a terminal may indirectly obtain same through PBCH decoding.

Timing information in radio frame: This information indicates one bit (a half frame) obtained through PBCH decoding and included in a PBCH payload and a synchronization signal block index described above, and a terminal may indirectly identify, through the one bit, whether a synchronization signal block has been transmitted in the first or second half frame in a radio frame.

The transmission bandwidth (12 RBs 305) of the PSS 301 and the SSS 303 and the transmission bandwidth (24 RBs 306) of the PBCH 302 are different from each other. Therefore, opposite six RBs 307 and 308 remain after excluding middle 12 RBs, on which the PSS 301 is transmitted, from the first OFDM symbol on which the PSS 301 is transmitted within the transmission bandwidth of the PBCH 302, and these regions may be used to transmit another signal, or may be empty.

A synchronization signal block may be transmitted using the same analog beam. That is, the PSS 301, the SSS 303, and the PBCH 302 may be transmitted using the same analog beam. Analog beams are unable to be applied differently along the frequency axis, and thus the same analog beam is applied on all frequency axis RBs in a particular OFDM symbol to which a particular analog beam is applied. That is, four OFDM symbols on which the PSS 301, the SSS 303, and the PBCH 302 are transmitted may be transmitted using the same analog beam.

Figure 4:
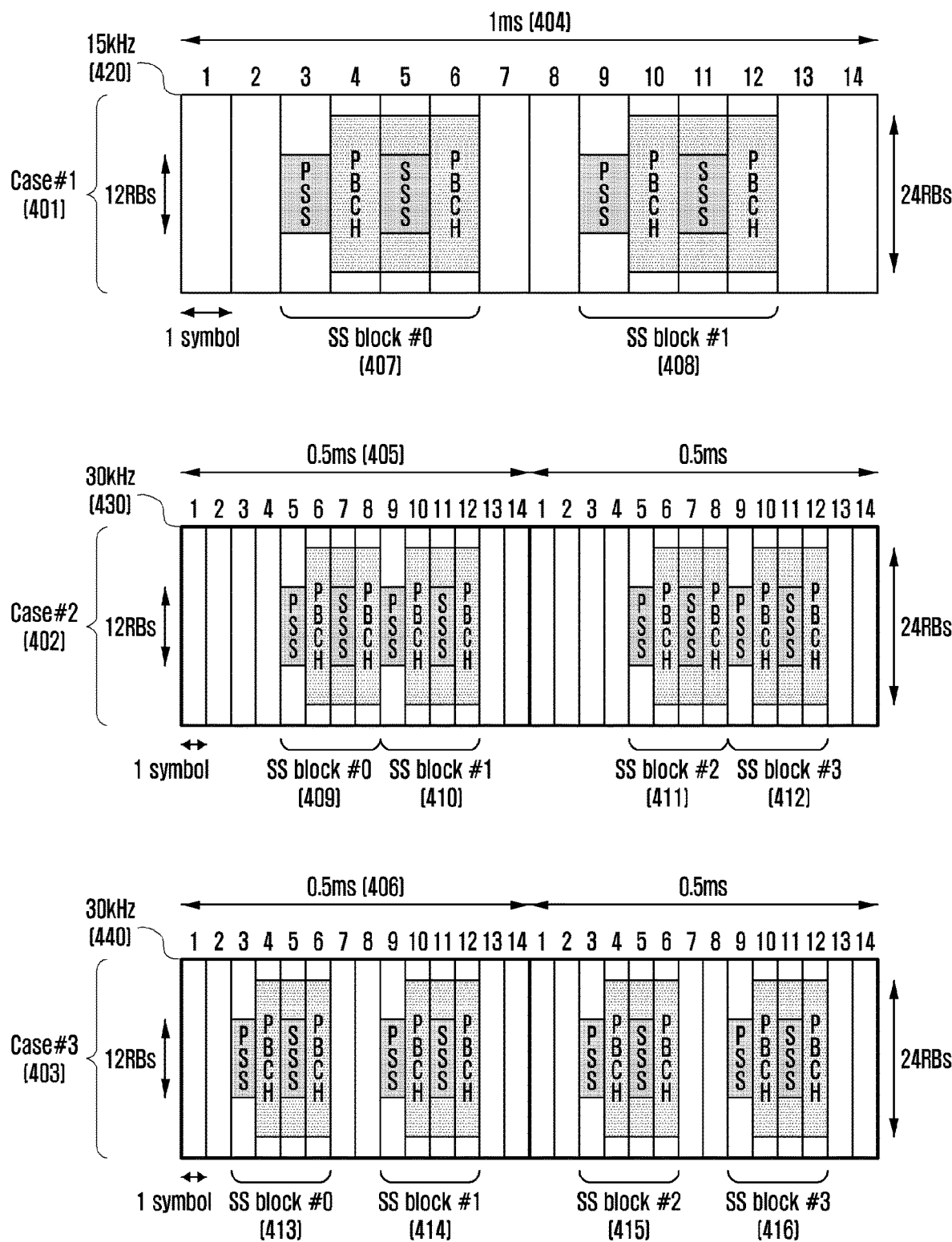
FIG. 4 illustrates cases of transmission of a synchronization signal block in a frequency band of 6 GHz or lower considered in a wireless communication system according to various embodiments of the present disclosure.

FIG. 4 illustrates an example of various cases of transmission of a synchronization signal block in a frequency band of 6 GHz or lower considered in a communication system according to various embodiments of the present disclosure.

In a 5G communication system, in a frequency band of 6 GHz or lower, a subcarrier spacing (SCS) of 15 KHz 420 and a subcarrier spacing of 30 kHz 430 and 440 may be used in transmission of a synchronization signal block. In relation to the subcarrier spacing of 15 kHz, one transmission case (case #1 401) relating to a synchronization signal block may exist, and in relation to the subcarrier spacing of 30 kHz, two transmission cases (case #2 402 and case #3 403) relating to a synchronization signal block may exist.

In FIG. 4, in case #1 401 of the subcarrier spacing of 15 kHz 420, a maximum of two synchronization signal blocks may be transmitted within a time interval of 1 ms 404 (or this corresponds to one slot length in a case where one slot is configured by 14 OFDM symbols). In one example of FIG. 4, a synchronization signal block #0 407 and a synchronization signal block #1 408 are illustrated. For example, the synchronization signal block #0 407 may be mapped to four consecutive symbols from the third OFDM symbol, and the synchronization signal block #1 408 may be mapped to four consecutive symbols from the ninth OFDM symbols.

Different analog beams may be applied to the synchronization signal block #0 407 and the synchronization signal block #1 408. The same beam may be applied to the third to sixth OFDM symbols to which the synchronization signal block #0 407 is mapped, and the same beam may be applied to the ninth to twelfth OFDM symbols to which the synchronization signal block #1 408 is mapped. Which analog beam is to be used in the seventh, eighth, thirteenth, and fourteenth OFDM symbols to which no synchronization signal block is mapped may be freely determined by the judgement of a base station.

In FIG. 4, in case #2 402 of the subcarrier spacing of 30 kHz 430, a maximum of two synchronization signal blocks may be transmitted within a time interval of 0.5 ms 405 (or this corresponds to one slot length in a case where one slot is configured by 14 OFDM symbols), and accordingly, a maximum of four synchronization signal blocks may be transmitted within a time interval of 1 ms (or this corresponds to two-slot length in a case where one slot is configured by 14 OFDM symbols). In one example of FIG.

4, a case where a synchronization signal block #0 409, a synchronization signal block #1 410, a synchronization signal block #2 411, and a synchronization signal block #3 412 are transmitted within a time of 1 ms (i.e., two slots) is illustrated. The synchronization signal block #0 409 and the synchronization signal block #1 410 may be mapped from the fifth OFDM symbol and the ninth OFDM symbol of the first slot, respectively, and the synchronization signal block #2 411 and the synchronization signal block #3 412 may be mapped from the third OFDM symbol and the seventh OFDM symbol of the second slot, respectively.

Different analog beams may be applied to the synchronization signal block #0 409, the synchronization signal block #1 410, the synchronization signal block #2 411, and the synchronization signal block #3 412. The same analog beam may be applied to each of the fifth to eighth OFDM symbols of the first slot, on which the synchronization signal block #0 409 is transmitted, the ninth to twelfth OFDM symbols of the first slot, on which the synchronization signal block #1 410 is transmitted, the third to sixth symbols of the second slot, on which the synchronization signal block #2 411 is transmitted, and the seventh to tenth symbols of the second slot, on which the synchronization signal block #3 412 is transmitted. Which analog beam is to be used on OFDM symbols to which no synchronization signal block is mapped may be freely determined by the judgement of a base station.

In FIG. 4, in case #3 403 of the subcarrier spacing of 30 kHz 440, a maximum of two synchronization signal blocks may be transmitted within a time interval of 0.5 ms 406 (or this corresponds to one slot length in a case where one slot is configured by 14 OFDM symbols), and accordingly, a maximum of four synchronization signal blocks may be transmitted within a time interval of 1 ms (or this corresponds to two-slot length in a case where one slot is configured by 14 OFDM symbols). In one example of FIG. 4, a case where a synchronization signal block #0 413, a synchronization signal block #1 414, a synchronization signal block #2 415, and a synchronization signal block #3 416 are transmitted within a time of 1 ms (i.e., two slots) is illustrated. The synchronization signal block #0 413 and the synchronization signal block #1 414 may be mapped from the third OFDM symbol and the ninth OFDM symbol of the first slot, respectively, and the synchronization signal block #2 415 and the synchronization signal block #3 416 may be mapped from the third OFDM symbol and the ninth OFDM symbol of the second slot, respectively.

Different analog beams may be used for the synchronization signal block #0 413, the synchronization signal block #1 414, the synchronization signal block #2 415, and the synchronization signal block #3 416, respectively. As described in the above examples, the same analog beam may be used on four OFDM symbols on which each synchronization signal block is transmitted, and which beam is to be used in OFDM symbols to which no synchronization signal block is mapped may be freely determined by the judgement of a base station.

Figure 5:
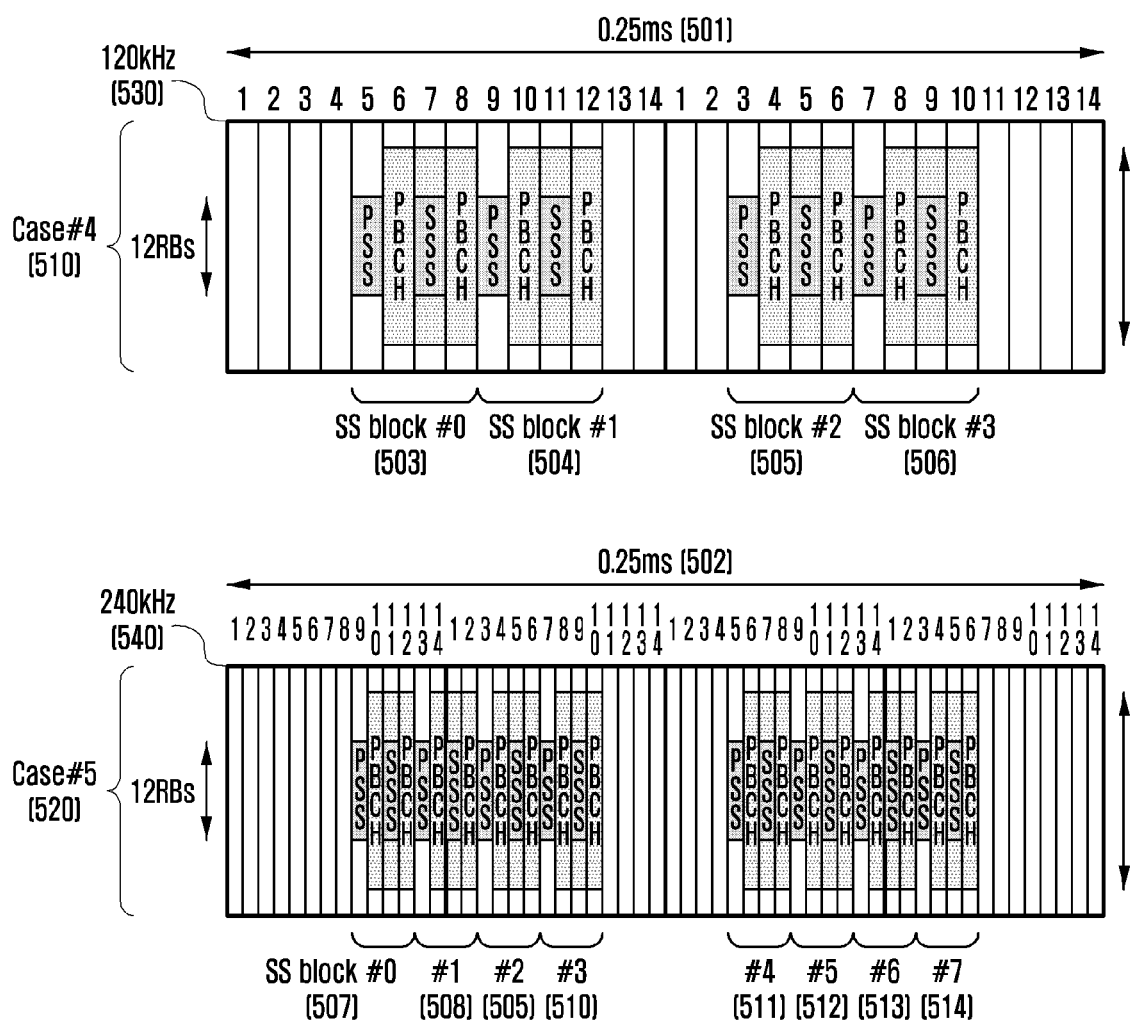
FIG. 5 illustrates cases of transmission of a synchronization signal block in a frequency band of 6 GHz or higher considered in a wireless communication system according to various embodiments of the present disclosure.

FIG. 5 illustrates cases of transmission of a synchronization signal block in a frequency band of 6 GHz or higher considered in a wireless communication system according to various embodiments of the present disclosure.

In a 5G communication system, in a frequency band of 6 GHz or higher, a subcarrier spacing of 120 kHz 530 as in an example of case #4 510 and a subcarrier spacing of 240 kHz 540 as in an example of case #5 520 may be used in transmission of a synchronization signal block.

In case #4 510 of the subcarrier spacing of 120 kHz 530, a maximum of four synchronization signal blocks may be transmitted within a time interval of 0.25 ms 501 (or this corresponds to two-slot length in a case where one slot is configured by 14 OFDM symbols). In one example of FIG. 5, a case where a synchronization signal block #0 503, a synchronization signal block #1 504, a synchronization signal block #2 505, and a synchronization signal block #3 506 are transmitted in 0.25 ms (i.e., two slots) is illustrated. The synchronization signal block #0 503 and the synchronization signal block #1 504 may be mapped to four consecutive symbols from the fifth OFDM symbol and the ninth OFDM symbol of the first slot, respectively, and the synchronization signal block #2 505 and the synchronization signal block #3 506 may be mapped to four consecutive symbols from the third OFDM symbol and the seventh OFDM symbol of the second slot, respectively.

As described in the above embodiment, different analog beams may be used for the synchronization signal block #0 503, the synchronization signal block #1 504, the synchronization signal block #2 505, and the synchronization signal block #3 506, respectively. The same analog beam may be used on four OFDM symbols on which each synchronization signal block is transmitted, and which beam is to be used in OFDM symbols to which no synchronization signal block is mapped may be freely determined by the judgement of a base station.

In case #5 520 of the subcarrier spacing of 240 kHz 540, a maximum of eight synchronization signal blocks may be transmitted within a time interval of 0.25 ms 502 (or this corresponds to four-slot length in a case where one slot is configured by 14 OFDM symbols). In one example of FIG. 5, a case where a synchronization signal block #0 507, a synchronization signal block #1 508, a synchronization signal block #2 509, a synchronization signal block #3 510, a synchronization signal block #4 511, a synchronization signal block #5 512, a synchronization signal block #6 513, and a synchronization signal block #7 514 are transmitted in 0.25 ms (i.e., four slots) is illustrated. The synchronization signal block #0 507 and the synchronization signal block #1 508 may be mapped to four consecutive symbols from the ninth OFDM symbol and the thirteenth OFDM symbol of the first slot, respectively, the synchronization signal block #2 509 and the synchronization signal block #3 510 may be mapped to four consecutive symbols from the third OFDM symbol and the seventh OFDM symbol of the second slot, respectively, the synchronization signal block #4 511, the synchronization signal block #5 512, and the synchronization signal block #6 513 may be mapped to four consecutive symbols from the fifth OFDM symbol, the ninth OFDM symbol, and the thirteenth OFDM symbol of the third slot, respectively, and the synchronization signal block #7 514 may be mapped to four consecutive symbols from the third OFDM symbol of the fourth slot.

As described in the above embodiment, different analog beams may be used for the synchronization signal block #0 507, the synchronization signal block #1 508, the synchronization signal block #2 509, the synchronization signal block #3 510, the synchronization signal block #4 511, the synchronization signal block #5 512, the synchronization signal block #6 513, and the synchronization signal block #7 514, respectively. The same analog beam may be used on four OFDM symbols on which each synchronization signal block is transmitted, and which beam is to be used in OFDM symbols to which no synchronization signal block is mapped may be freely determined by the judgement of a base station.

Figure 6:
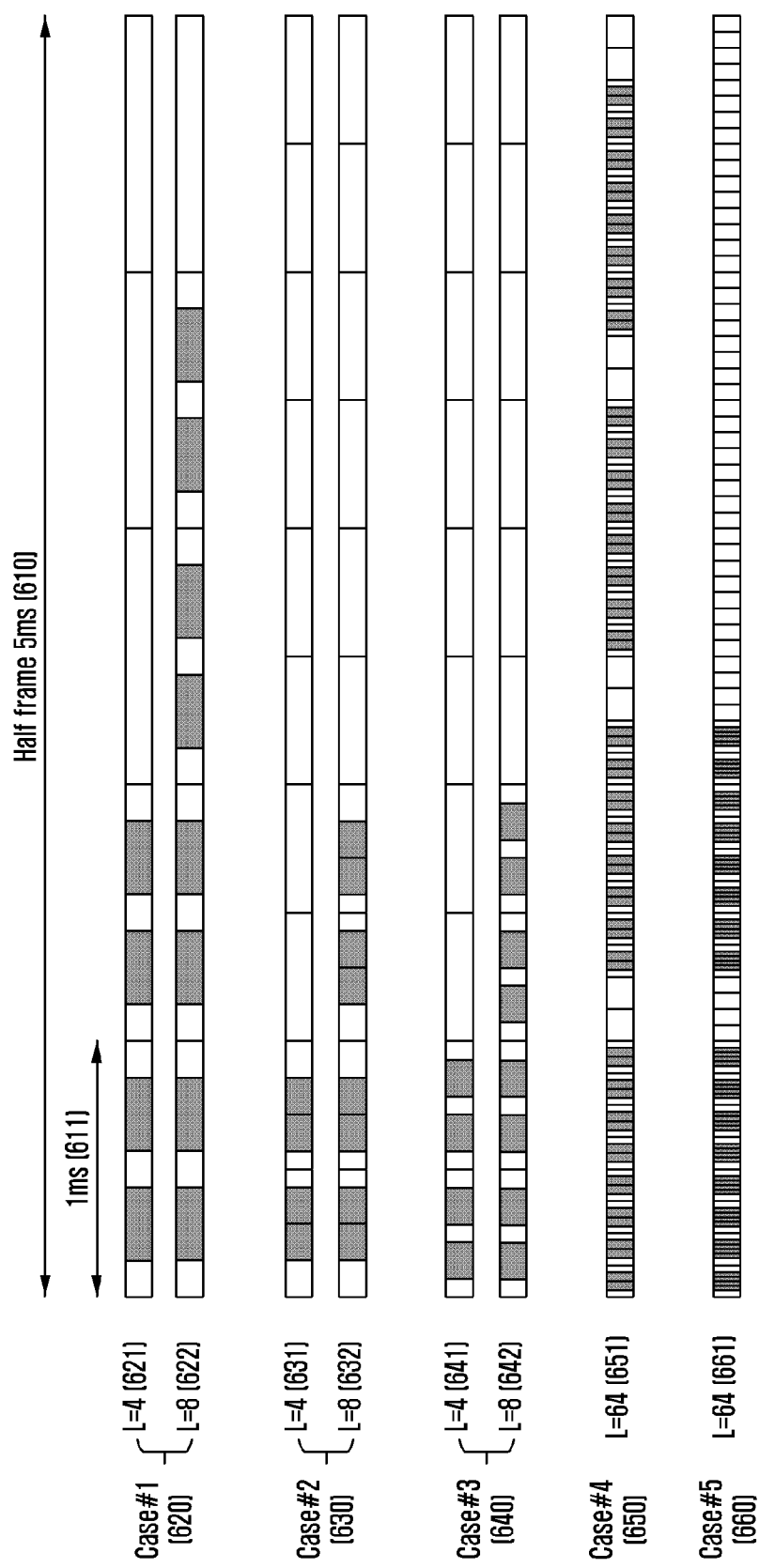
FIG. 6 illustrates cases of transmission of a synchronization signal block according to a subcarrier spacing within a time of 5 ms in a wireless communication system according to various embodiments of the present disclosure.

FIG. 6 illustrates cases of transmission of a synchronization signal block according to a subcarrier spacing within a time of 5 ms in a wireless communication system to which the disclosure is applied. In a 5G communication system, a synchronization signal block may be periodically transmitted in a unit of 5 ms 610 (this corresponds to five subframes or a half frame).

In a frequency band of 3 GHz or lower, a maximum of four synchronization signal blocks may be transmitted in a time interval of 5 ms 610. In a frequency band of 3 GHz (exclusive) to 6 GHz, a maximum of eight synchronization signal blocks may be transmitted. In a frequency band exceeding 6 GHz, a maximum of 64 synchronization signal blocks may be transmitted. As described above, subcarrier spacings of 15 kHz and 30 kHz may be used at a frequency of 6 GHz or lower.

In one example of FIG. 6, in case #1 401 of the subcarrier spacing of 15 kHz configured by one slot in FIG. 4, a synchronization signal block may be mapped to the first slot and the second slot in a frequency band of 3 GHz or lower, and thus a maximum of four synchronization signal blocks 621 may be transmitted. In a frequency band of 3 GHz (exclusive) to 6 GHz, a synchronization signal block may be mapped to the first, second, third, and fourth slots, and thus a maximum of eight synchronization signal blocks 622 may be transmitted.

In case #2 402 or case #3 403 of the subcarrier spacing of 30 kHz configured by two slots in FIG. 4, a synchronization signal block may be mapped starting from the first slot in a frequency band of 3 GHz or lower, and thus a maximum of four synchronization signal blocks 631 or 641 may be transmitted. In a frequency band of 3 GHz (exclusive) to 6 GHz, a synchronization signal block may be mapped starting from the first and third slots, and thus a maximum of eight synchronization signal blocks 632 or 642 may be transmitted.

The subcarrier spacings of 120 kHz and 240 kHz may be used at a frequency exceeding 6 GHz. In one example of FIG. 6, in case #4 510 of the subcarrier spacing of 120 kHz configured by two slots in FIG. 5, a synchronization signal block may be mapped starting from the first, third, fifth, seventh, eleventh, thirteenth, fifteenth, seventeenth, twenty-first, twenty-third, twenty-fifth, twenty-seventh, thirty-first, thirty-third, thirty-fifth, and thirty-seventh slots in a frequency band exceeding 6 GHz, and thus a maximum of 64 synchronization signal blocks 651 may be transmitted. In one example of FIG. 6, in case #5 520 of the subcarrier spacing of 240 kHz configured by four slots in FIG. 5, a synchronization signal block may be mapped starting from the first, fifth, ninth, thirteenth, twenty-first, twenty-fifth, twenty-ninth, and thirty-third slots in a frequency band exceeding 6 GHz or higher, and thus a maximum of 64 synchronization signal blocks 661 may be transmitted.

A terminal may decode a PDCCH and a PDSCH, based on system information included in a received MIB, and then obtain an SIB. The SIB may include at least one of at least an uplink cell bandwidth, a random access parameter, a paging parameter, and a parameter related to uplink power control.

In 3GPP, a discussion about a reduced capability terminal (UE) operated based on NR is in progress. In the disclosure, the reduced capability terminal may receive a synchronization signal block, as in the embodiment of FIG. 4 or FIG. 5, in an initial cell access for accessing a cell (or a base station), to obtain cell synchronization, and then determine, through MIB acquisition, SIB acquisition, or a random access process, whether the cell supports a reduced capability terminal. When the cell is determined to support a reduced capability terminal, the reduced capability terminal may transmit, to the base station, at least one of pieces of capability information relating to a bandwidth size supported by the reduced capability terminal in the cell, whether a full-duplex communication or a half-duplex communication is supported, the number of transmission or reception antennas included in (or supported by) the terminal, whether the reduced capability terminal supports a case where a terminal-specific bandwidth part configured by a higher layer signaling includes a control resource set #0 and a synchronization signal block, or whether the reduced capability terminal supports even a case where a terminal-specific bandwidth part configured by a higher layer signaling does not include a control resource set #0 and a synchronization signal block. Therefore, the base station may be informed that the terminal attempting to access is a reduced capability terminal. Alternatively, when support of a half-duplex communication is necessarily implemented for a reduced capability terminal, whether a half-duplex communication is supported as described above may be omitted from the capability information.

A base station may configure separate random access resources for a reduced capability terminal, or a reduced capability terminal supporting a duplex communication and a reduced capability terminal supporting a half-duplex communication, respectively, and may transmit configuration information on the random access resource to the reduced capability terminal through system information. The system information for transmission of the information on the random access resource may be separately transmitted system information distinguished from system information for a terminal supporting a different version of protocol in a cell, and the base station may configure separate random access resources for a terminal supporting a different version of protocol and a reduced capability terminal, whereby it may be possible to distinguish whether the terminal supporting the different version of protocol performs a random access or the reduced capability terminal performs a random access. Alternatively, a base station may not configure a separate random access resource for a reduced capability terminal, and may configure a common random access resource for all terminals in a cell. Configuration information on the random access resource may be transmitted to all the terminals in the cell through system information, and a terminal having received the system information may perform a random access on the random access resource.

Thereafter, the terminal may complete a random access process and then enter an RRC connection mode for transmission or reception of data with the cell.

Generally, a terminal may establish a wireless link with a network through a random access procedure, based on system information and synchronization with the network, obtained in a cell search process for a cell. A contention-based scheme or a contention-free scheme may be used for a random access. The contention-based access scheme may be used for a case when a terminal performs cell selection and reselection in an initial cell access stage, for example, a case when an RRC IDLE state is changed to an RRC CONNECTED state. The contention-free random access may be used for a case where downlink data has arrived, a case of handover, or a case of reconfiguring uplink synchronization in a position measurement.

Table 3 below shows an example of conditions (events) to trigger a random access procedure in a 5G system. For a detailed description, TS 38.300 may be referred to.

TABLE 3

Initial access from RRC_IDLE;
RRC Connection Re-establishment procedure;
DL or UL data arrival during RRC_CONNECTED when UL synchronisation status is "non-synchronised";
UL data arrival during RRC_CONNECTED when there are no PUCCH resources for SR available;
SR failure;
Request by RRC upon synchronous reconfiguration (e.g., handover);
Transition from RRC_INACTIVE;
To establish time alignment for a secondary TAG;
Request for Other SI (see clause 7.3);
Beam failure recovery;

Next, a bandwidth part (BWP) configuration in a 5G communication system will be described in detail with reference to the drawings.

In a 5G communication system, a base station may configure one or multiple bandwidth parts for a terminal, and may configure pieces of information below for each bandwidth part.

TABLE 4

```
BWP ::=                    SEQUENCE {
    bwp-Id                 BWP-Id,
    (Bandwidth part identifier)
    locationAndBandwidth   INTEGER (1..65536),
    (Location of bandwidth part)
    subcarrierSpacing      ENUMERATED {n0, n1, n2, n3, n4, n5},
    (Subcarrier spacing)
    cyclicPrefix           ENUMERATED { extended }
    (Cyclic prefix)
}
```

In addition to the configuration information described above, various parameters related to a bandwidth part may be configured for a terminal. The pieces of information may be transferred by a base station to a terminal through higher layer signaling, for example, RRC signaling. At least one bandwidth part among the configured one or multiple bandwidth parts may be activated. Whether the configured bandwidth part is activated may be semi-statically transferred from the base station to the terminal through RRC signaling, or dynamically transferred through DCI.

An initial bandwidth part (BWP) for an initial access may be configured for the terminal before an RRC connection by the base station through a master information block (MIB) or a system information block 1 (SIB1).

In a detailed description for a configuration of a control resource set #0, a search space #0, and an initial bandwidth part, a terminal may receive, through an MIB in an initial access stage, configuration information on a control resource set #0 and a search space #0 in which a PDCCH may be transmitted, the PDCCH being provided to receive system information (this may correspond to remaining minimum system information (RMSI) or a system information block 1 (SIB1)) required for initial access. A control resource set and a search space that are configured through an MIB may be assumed to each have an identity (ID) of 0. A base station may notify a terminal of configuration information such as frequency allocation information, time allocation information, and numerology on a control resource set #0 through an MIB. In addition, the base station may notify, through an MIB, the terminal of configuration information on a monitoring period and occasion for a control resource set #0, that is configuration information on a search space #0.

In relation to a method for configuring the initial bandwidth part, terminals before RRC-connected may receive configuration information on the initial bandwidth part through a master information block (MIB) in an initial access stage. More specifically, a CORESET for a downlink control channel in which DCI scheduling an SIB may be transmitted may be configured for a terminal from an MIB of a PBCH. The bandwidth of a control resource set configured by an MIB may be considered as an initial bandwidth part, and a terminal may receive a PDSCH in which an SIB is transmitted, through the configured initial bandwidth part. The initial bandwidth part may also be used for other system information (OSI), paging, and random access in addition to the reception of a SIB.

In a case of a reduced capability terminal, a complexity reducing method to reduce an RF bandwidth (in a case of FR1, 100 MHz is reduced to 20 MHz, and in a case of FR2, 200 MHz is reduced to 100 MHz) and to reduce the number of reception antennas from 4 or 2 to 1, or from 2 to 1 is considered to reduce the complexity of the terminal. In a case where a reduced capability terminal and a conventional non-reduced capability terminal (or Rel-16 terminal) coexist in one base station, a method for supporting an initial bandwidth part and a control resource set #0 at the time of an initial access by the reduced capability terminal is required due to an RF bandwidth of only the reduced capability terminal different from the conventional Rel-16 terminal. In addition, the number of reception antennas of the reduced capability terminal may be smaller than that of the conventional Rel-16 terminal, and thus many downlink resources for a control resource set #0 may be required to provide a downlink coverage similar to that of the conventional Rel-16 terminal. The disclosure provides a method for minimizing effect on a downlink resource required for data transmission or reception with a conventional Rel-16 terminal, and supporting a reduced capability terminal-specific initial bandwidth part and control resource set #0 at the time of initial access by multiple reduced capability terminals.

Figure 7:
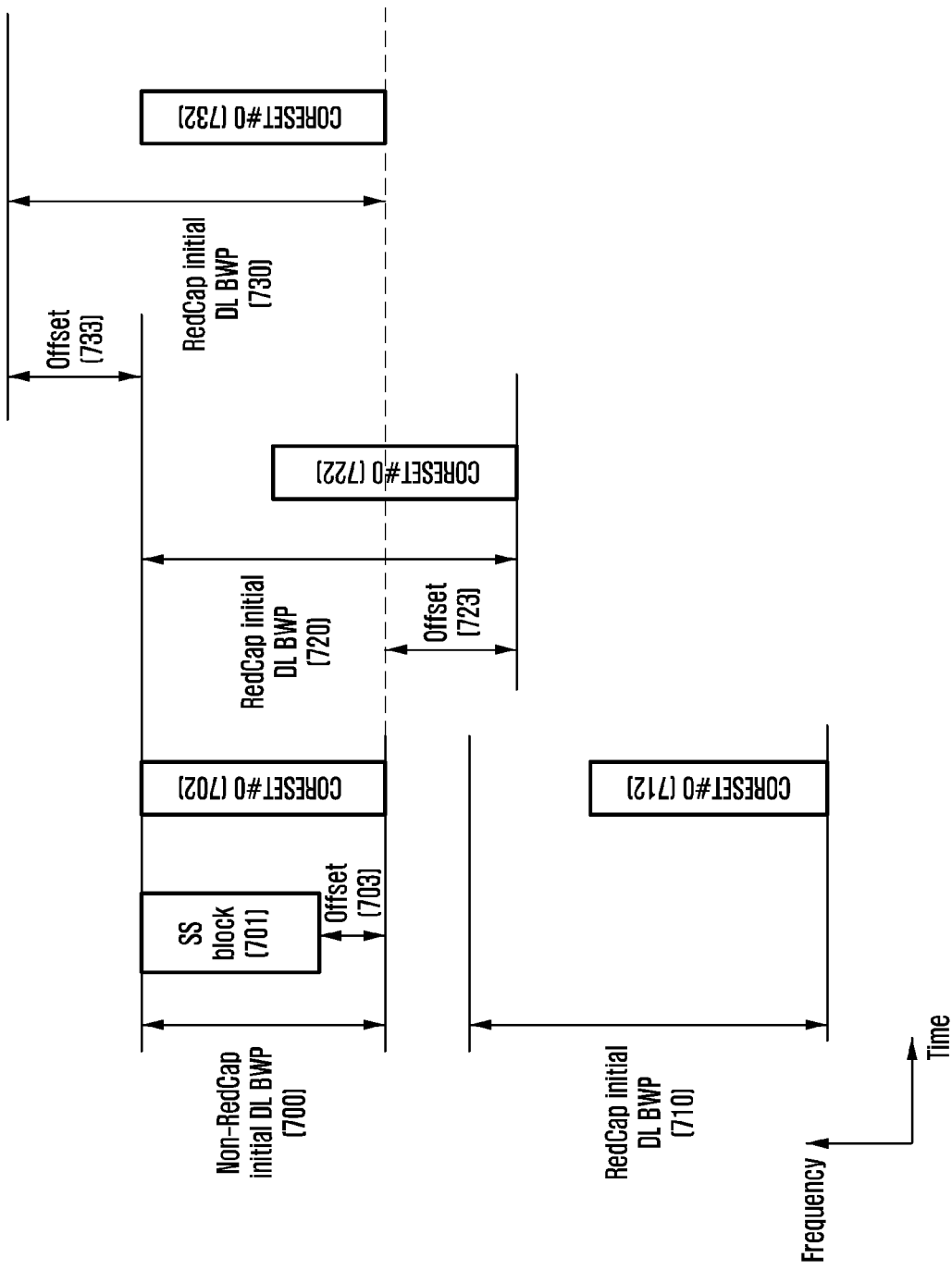
FIG. 7 illustrates a reduced capability terminal-specific initial bandwidth part and a control resource set #0 according to various embodiments of the present disclosure.

FIG. 7 illustrates an example of a configuration of an initial bandwidth part and a control resource set #0 for a reduced capability terminal. With reference to FIG. 7, a method in which a reduced capability terminal receives a resource configuration for an initial bandwidth part on a resource different from that of a non-reduced capability terminal (or conventional Rel-16 terminal), and receives a resource configuration on a control resource set #0 which may exist within an initial bandwidth will be described.

As described with reference to FIG. 3, a conventional Rel-16 terminal or a reduced capability terminal may receive a PSS, an SSS, and a PBCH on a synchronization signal block 701. The conventional Rel-16 terminal or reduced capability terminal may obtain, through a pdcch-ConfigSIB1 in an MIB on the PBCH, multiplexing pattern information between the synchronization signal block 701 and a control resource set #0 702, the number of RBs of the control resource set #0 702 in the frequency domain and the number of symbols thereof in the time domain, information on an offset 703 between the frequency domain starting position of the control resource set #0 702 and the frequency domain starting position of the synchronization signal block 701, and the slot and symbol position of the control resource set #0 in the time domain.

For example, a Rel-16 terminal or reduced capability terminal may determine one index value among index values from 0 to 15 in Table 5 below through four bits of a pdcch-ConfigSIB1, and may obtain some of the pieces of information corresponding to the determined index value, that is multiplexing pattern information between the synchronization signal block 701 and the control resource set #0

702, the number of RBs of the control resource set #0 702 in the frequency domain and the number of symbols thereof in the time domain, and information on the offset 703 between the frequency domain starting position of the control resource set #0 702 and the frequency domain starting position of the synchronization signal block 701. In addition, the Rel-16 terminal or reduced capability terminal may determine one index value among index values from 0 to 15 in Table 6 below through another four bits of the pdcch-ConfigSIB1, and may obtain some of the pieces of information corresponding to the determined index value, that is the slot and symbol position of the control resource set #0 in the time domain.

Table 5 and Table 6 below show only partial tables, and there may be other tables for mapping the same information. Hereinafter, a table for indicating, through a particular number of bits, multiplexing pattern information between a synchronization signal block and a control resource set #0, the number of RBs of a control resource set #0 in the frequency domain and the number of symbols thereof in the time domain, and information on an offset between the frequency domain starting position of a control resource set #0 and the frequency domain time position of a synchronization signal block together may be Table 5. A table for indicating, through a particular number of bits, the slot and symbol position of a control resource set #0 in the time domain may be Table 6. Which table the reduced capability terminal is to select among Table 5 and Table 6 described above may be determined by the subcarrier spacing (SCS) of a synchronization signal block, the SCS of a control channel, the minimum channel bandwidth of a frequency band, and information on a frequency band operated based on shared spectrum channel access. In relation to Table 5 and Table 6 below, TS 38.213 may be referred to.

TABLE 5

| Index | SS/PBCH block and CORESET multiplexing pattern | Number of RBs $N_{RB}^{CORESET}$ | Number of Symbols $N_{symb}^{CORESE}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | | | Reserved | |

TABLE 6

| Index | O | Number of search space sets per slot | M | First symbol index |
|---|---|---|---|---|
| 0 | 0 | 1 | 1 | 0 |
| 1 | 0 | 2 | 1/2 | {0, if i is even}, {$N_{symb}^{CORESET}$, if i is odd} |
| 2 | 2 | 1 | 1 | 0 |
| 3 | 2 | 2 | 1/2 | {0, if i is even}, {$N_{symb}^{CORESET}$, if i is odd} |
| 4 | 5 | 1 | 1 | 0 |

TABLE 6-continued

| Index | O | Number of search space sets per slot | M | First symbol index |
|---|---|---|---|---|
| 5 | 5 | 2 | 1/2 | {0, if i is even}, {$N_{symb}^{CORESET}$, if i is odd} |
| 6 | 7 | 1 | 1 | 0 |
| 7 | 7 | 2 | 1/2 | {0, if i is even}, {$N_{symb}^{CORESET}$, if i is odd} |
| 8 | 0 | 1 | 2 | 0 |
| 9 | 5 | 1 | 2 | 0 |
| 10 | 0 | 1 | 1 | 1 |
| 11 | 0 | 1 | 1 | 2 |
| 12 | 2 | 1 | 1 | 1 |
| 13 | 2 | 1 | 1 | 2 |
| 14 | 5 | 1 | 1 | 1 |
| 15 | 5 | 1 | 1 | 2 |

A conventional Rel-16 terminal or reduced capability terminal may determine the time-frequency positions of the control resource set #0 702 through acquisition of the pieces of information.

When a configuration on an initial bandwidth part is not provided to the conventional Rel-16 terminal or reduced capability terminal through initialDownlinkBWP in an SIB1, an initial bandwidth part 700 may be defined to have the frequency region of the control resource set #0 702, that is the same frequency resource as a frequency resource of the position and the number of consecutive PRBs starting from the PRB of the control resource set #0 702 having the lowest value and ending at the PRB having the highest value.

The initial bandwidth part may be a common initial bandwidth part or a common control resource set #0 which is applicable to a conventional Rel-16 terminal or reduced capability terminal, that is all terminals in a cell. However, the number of reception antennas of the reduced capability terminal may be smaller than that of the conventional Rel-16 terminal, and thus many downlink resources in an initial bandwidth part or a control resource set #0 may be required to provide a downlink coverage similar to that of the conventional Rel-16 terminal. Required is a method for minimizing effect on a downlink resource in an initial bandwidth required for data transmission or reception with a conventional Rel-16 terminal, and supporting a reduced capability terminal-specific initial bandwidth part and control resource set #0 at the time of initial access by multiple reduced capability terminals.

First, it is possible for the reduced capability terminal to use a spare 1 bit that is the last bit in an MIB on the PBCH so as to determine whether a reduced capability terminal-specific initial bandwidth part or control resource set #0 exists. That is, a base station indicates whether a reduced capability terminal-specific initial bandwidth part or control resource set #0 exists through, for example, ENUMERATED {existed, notExisted} by using the spare 1 bit, and a reduced capability terminal receives the above value in the spare 1 bit, thereby determining whether a reduced capability terminal-specific initial bandwidth part or control resource set #0 exists.

Next, a method for configuring a reduced capability terminal-specific initial bandwidth part or control resource set #0 for a reduced capability terminal through an SIB1 or a new reduced capability terminal-specific SIB will be described. In the disclosure, a method for determining a frequency or time resource of a reduced capability terminal-specific initial bandwidth part and/or control resource set #0 through a scheme of associating position information on the frequency or time resource of the common initial bandwidth part or control resource set #0 with position information on the frequency and/or time resource of the reduced capability terminal-specific initial bandwidth part or control resource set #0 is mainly described. A method for determining a frequency or time resource of the reduced capability terminal-specific initial bandwidth part and/or control resource set #0 independently to a resource configuration of a common initial bandwidth part or control resource set #0 is also provided. In the following methods, the size of, in the frequency domain, a reduced capability terminal-specific initial bandwidth part or control resource set #0 may be configured within a maximum of 20 MHz in a case of FR1 (e.g., 450 MHz-7125 MHz), and within a maximum of 100 MHz in a case of FR2 (e.g., 24250 MHz-52600 MHz).

In the first method, the time resource of a reduced capability terminal-specific control resource set #0 712 may be determined from position information on the time resource of the common control resource set #0 702. The time resource of the reduced capability terminal-specific control resource set #0 712 may be expressed by at least one slot and/or at least one symbol, the starting point expressed by a slot and/or symbol and the length (slot and/or symbol) of the time resource, or offset information. The time resource of the reduced capability terminal-specific control resource set #0 712 may be obtained by changing the time resource of the common control resource set #0 702 by a predetermined method.

That is, information indicating the time resource of the reduced capability terminal-specific control resource set #0 712 may be determined based on information indicating the time resource of the common control resource set #0 702. For example, the slot and symbol position of the reduced capability terminal-specific control resource set #0 712 may be the same as determined from the slot and symbol position of the common control resource set #0 702. A reduced capability terminal-specific initial bandwidth part 710 may be positioned in a frequency region different from that of the common initial bandwidth part 700. This description merely corresponds to an example, and the disclosure is not limited to the example.

Therefore, a reduced capability terminal may receive configuration information on the reduced capability terminal-specific initial bandwidth part 710 through an SIB1 or a new reduced capability terminal-specific SIB. For example, initialDownlinkBWPForRedCap that is configuration information on the reduced capability terminal-specific initial bandwidth part 710 may be included in an SIB1, for example, at the end of the SIB1 as shown below.

TABLE 7

```
DownlinkConfigCommonSIB ::= SEQUENCE {
  frequencyInfoDL              FrequencyInfoDL-SIB,
  initialDownlinkBWP           BWP-DownlinkCommon,
  bcch-Config                  BCCH-Config,
  pcch-Config                  PCCH-Config,
  ...
  initialDownlinkBWPForRedCap  BWP-DownlinkCommon,
}
```

As another example, initialDownlinkBWP that is configuration information on the reduced capability terminal-specific initial bandwidth part 710 may be included in a new SIB for only a reduced capability terminal as shown below.

TABLE 8

```
SIBForRedCap ::= SEQUENCE {
  initialDownlinkBWP    BWP-DownlinkCommon,
}
```

InitialDownlinkBWPForRedCap or initialDownlinkBWP that is configuration information on the reduced capability terminal-specific initial bandwidth part may include information indicating the frequency position and bandwidth of the initial bandwidth part, information indicating a subcarrier spacing, and information indicating a cyclic prefix.

In the first method, a configuration on the remaining resource except for the time resource of the reduced capability terminal-specific control resource set #0 712 is possible through a method in which an index value indicating a resource configuration is indicated through PDCCH-ConfigCommon included in the SIB1 or the new reduced capability terminal-specific SIB, the method being similar to the scheme in which the PDCCH-ConfigSIB1 indicates an index value in Table 5 and Table 6. The index value indicated in PDCCH-ConfigCommon included in the SIB1 or the new SIB may be based on Table 5 and Table 6. In Table 5 and Table 6, only some pieces of information including the number of RBs of the control resource set #0 712 in the frequency domain may be valid to a reduced capability terminal. A reduced capability terminal may disregard at least one of pieces of information except for the pieces of information, that is multiplexing pattern information between a synchronization signal block and the control resource set #0 712, and information on the offset between the frequency domain starting position of the control resource set #0 712 and the frequency domain starting position of the synchronization signal block. Alternatively, the reduced capability terminal may expect that a value indicating the same position as the slot and symbol position of the common control resource set #0 702, for example, is configured for information on the number of symbols of the control resource set #0 712 in the time domain, and information on the slot and symbol position of the control resource set #0 in the time domain in Table 5 and Table 6.

Alternatively, it is also possible to define a table similar to Table 5 and Table 6 above for the reduced capability terminal-specific control resource set #0 712. In this case, it is possible to indicate at least one piece of information among the number of RBs in the frequency domain, multiplexing pattern information between a synchronization signal block and the control resource set #0 712, and offset information on the control resource set #0 712 by using an index value indicated in PDCCH-ConfigCommon included in the SIB1 or the new reduced capability terminal-specific SIB. It is also possible that the index based on the table indicates only some pieces of information including the number of RBs of the control resource set #0 712 in the frequency domain.

In the second method, the time or frequency resource of the reduced capability terminal-specific control resource set #0 712 may be determined independently to position information on the time or frequency resource of the common control resource set #0 702.

Therefore, a method for configuring the frequency or time resource of the reduced capability terminal-specific initial bandwidth part 710 and control resource set #0 712 may be required. First, a method for configuring a reduced capability terminal-specific initial bandwidth will be described below. A reduced capability terminal may receive configuration information on the reduced capability terminal-specific initial bandwidth part 710 through an SIB1 or a new reduced capability terminal-specific SIB. For example, initialDownlinkBWPForRedCap that is configuration information on the reduced capability terminal-specific initial bandwidth part 710 may be included in an SIB1, for example, at the end of the SIB1 as shown below.

TABLE 9

```
DownlinkConfigCommonSIB ::= SEQUENCE {
    frequencyInfoDL              FrequencyInfoDL-SIB,
    initialDownlinkBWP           BWP-DownlinkCommon,
    bcch-Config                  BCCH-Config,
    pcch-Config                  PCCH-Config,
    ...
    initialDownlinkBWPForRedCap  BWP-DownlinkCommon,
}
```

As another example, initialDownlinkBWP that is configuration information on the reduced capability terminal-specific initial bandwidth part 710 may be included in a new SIB for only a reduced capability terminal as shown below.

TABLE 10

```
SIBForRedCap ::= SEQUENCE {
    initialDownlinkBWP     BWP-DownlinkCommon,
}
```

InitialDownlinkBWPForRedCap or initialDownlinkBWP that is configuration information on the reduced capability terminal-specific initial bandwidth part may include information indicating the frequency position and bandwidth of the initial bandwidth part, information indicating a subcarrier spacing, and information indicating a cyclic prefix.

Next, a configuration on the frequency or time resource of the reduced capability terminal-specific control resource set #0 712 is possible through a scheme in which an index value indicating a resource configuration is indicated through PDCCH-ConfigCommon included in the SIB1 or the new SIB, the method being similar to the scheme in which the PDCCH-ConfigSIB1 indicates an index value in Table 5 and Table 6. The index value indicated in PDCCH-ConfigCommon included in the SIB1 or the new SIB may be based on Table 5 and Table 6. In Table 5 and Table 6, only some pieces of information including information on the number of RBs of the control resource set #0 712 in the frequency domain and the number of symbols thereof in the time domain and information on the slot and symbol position of the control resource set #0 712 in the time domain may be valid to a reduced capability terminal. A reduced capability terminal may disregard at least one of pieces of information except for the pieces of information, that is multiplexing pattern information between a synchronization signal block and the control resource set #0 712, and information on the offset between the frequency domain starting position of the control resource set #0 712 and the frequency domain starting position of the synchronization signal block.

Alternatively, it is also possible to define a table similar to Table 5 and Table 6 above for the reduced capability terminal-specific control resource set #0 712. In this case, it is possible to indicate at least one piece of information among the number of RBs in the frequency domain, information on the slot and symbol position of the control resource set #0 712 in the time domain, multiplexing pattern information between a synchronization signal block and the control resource set #0 712, and offset information on the control resource set #0 712 by using an index value indicated in PDCCH-ConfigCommon included in the SIB1 or the new SIB. It is also possible that the index based on the table indicates only some pieces of information including information on the number of RBs of the control resource set #0 712 in the frequency domain and the number of symbols thereof in the time domain and information on the slot and symbol position of the control resource set #0 712 in the time domain.

In the third method, the frequency resource of a reduced capability terminal-specific initial bandwidth part 720 or 730 or control resource set #0 722 or 732 may be determined from position information on the frequency resource of the common initial bandwidth part 700 or control resource set #0 702. The frequency resource of the reduced capability terminal-specific control resource set #0 722 or 732 may be expressed by at least one PRB, the starting point expressed by a PRB and/or a subcarrier and the width (PRB and/or subcarrier) of the frequency resource, or offset information. The frequency resource of the reduced capability terminal-specific control resource set #0 722 or 732 may be obtained by changing the frequency resource of the common control resource set #0 702 by a pre-determined method. That is, information indicating the frequency resource of the reduced capability terminal-specific control resource set #0 722 or 732 may be determined based on information indicating the frequency resource of the common control resource set #0 702.

For example, the PRB position of the reduced capability terminal-specific initial bandwidth part 720 on the frequency axis may include the frequency region of the common initial bandwidth part 700 or control resource set #0 702, and include an additional frequency region by an offset 723, based on the PRB of the common initial bandwidth part 700 or control resource set #0 702, which has the lowest value. As another example, the frequency PRB position of the terminal-specific initial bandwidth part 730 may include the frequency region of the common initial bandwidth part 700 or control resource set #0 702, and include an additional frequency region by an offset 733, based on the PRB of the common initial bandwidth part 700 or control resource set #0 702, which has the highest value. This description merely corresponds to an example, and the disclosure is not limited to the example.

Next, a configuration on the frequency or time resource of the reduced capability terminal-specific control resource set #0 722 or 732 is possible through a method in which an index value indicating a resource configuration is indicated through PDCCH-ConfigCommon included in the SIB1 or the new reduced capability terminal-specific SIB, the method being similar to the scheme in which the PDCCH-ConfigSIB1 indicates an index value in Table 5 and Table 6. The index value indicated in PDCCH-ConfigCommon included in the SIB1 or the new SIB may be based on Table 5 and Table 6. In Table 5 and Table 6, only some pieces of information including information on the number of RBs of the control resource set #0 722 or 732 in the frequency domain and the number of symbols thereof in the time domain and information on the slot and symbol position of the control resource set #0 722 or 732 in the time domain may be valid to a reduced capability terminal. A reduced capability terminal may disregard at least one of pieces of information except for the pieces of information, that is multiplexing pattern information between a synchronization signal block and the control resource set #0 722 or 732, and information on the offset between the frequency domain starting position of the control resource set #0 722 or 732 and the frequency domain starting position of the synchronization signal block. The starting position of the control resource set #0 722 or 732 in the frequency domain may be the same as the starting point of the reduced capability terminal-specific initial bandwidth part 720 or 730 in the frequency domain, which is determined above.

Alternatively, it is also possible to define a table similar to Table 5 and Table 6 above for the reduced capability terminal-specific control resource set #0 722 or 732. In this case, it is possible to indicate at least one piece of information among the number of RBs in the frequency domain, information on the slot and symbol position of the control resource set #0 712 in the time domain, multiplexing pattern information between a synchronization signal block and the control resource set #0 712, and offset information on the control resource set #0 712 by using an index value indicated in PDCCH-ConfigCommon included in the SIB1 or the new SIB. It is also possible that the index based on the table indicates only some pieces of information including information on the number of RBs of the control resource set #0 722 or 732 in the frequency domain and the number of symbols thereof in the time domain and information on the slot and symbol position of the control resource set #0 722 or 732 in the time domain.

A reduced capability terminal-specific initial bandwidth part and control resource set #0 provided through the above method is also able to be used after initial access. That is, a protocol may define that a reduced capability terminal is required to use only the common initial bandwidth part or control resource set #0 until a random access is performed after an initial cell access, and a protocol may define an operation of transmitting or receiving data on the reduced capability terminal-specific initial bandwidth part and control resource set #0 after a random access, for example, PUCCH transmission for msg 4. Alternatively, a protocol may also define an operation of transmitting or receiving data on the reduced capability terminal-specific initial bandwidth part and control resource set #0 immediately when a reduced capability terminal receives a configuration on the reduced capability terminal-specific initial bandwidth part and control resource set #0.

Hereinafter, a method for determining an initial bandwidth part by a reduced capability terminal will be described.

When a reduced capability terminal receives a common initial bandwidth part through reception of an SIB1 or a new reduced capability terminal-specific SIB, or receives a configuration on a common control resource set #0 through reception of an MIB, and receives configuration information on a reduced capability terminal-specific initial bandwidth part, a procedure for the reduced capability terminal to determine an initial bandwidth part is required.

In the following description, a reduced capability terminal may be a terminal supporting a bandwidth within 20 MHz in a serving cell of FR1, or a terminal supporting a bandwidth within 100 MHz in a serving cell of FR2.

If a configuration on a terminal-common or a reduced capability terminal-specific initial bandwidth part is not provided to a reduced capability terminal through initialDownlinkBWP in an SIB1 or a new reduced capability terminal-specific SIB, the reduced capability terminal may determine that an initial bandwidth part is the same as the frequency region of the common control resource set #0 702 obtained by MIB reception. That is, an initial bandwidth part may be defined to have the same frequency resource as a frequency resource of the position and the number of consecutive PRBs starting from the PRB of the control resource set #0 702 having the lowest value and ending at the PRB having the highest value.

If the bandwidth of an initial bandwidth part provided by initialDownlinkBWP in an SIB1 to the reduced capability terminal is larger than 20 MHz in a case of a serving cell at FR1 or is larger than 100 MHz in a case of a serving cell at FR2, and a reduced capability terminal-specific initialDownlinkBWP in an SIB1 or a new reduced capability terminal-specific SIB is not provided, the reduced capability terminal may determine that an initial bandwidth part is the same as the frequency region of the common control resource set #0 702 obtained by MIB reception.

If the bandwidth of an initial bandwidth part provided by initialDownlinkBWP in an SIB1 to the reduced capability terminal is larger than 20 MHz in a case of a serving cell at FR1 or is larger than 100 MHz in a case of a serving cell at FR2, and a reduced capability terminal-specific initialDownlinkBWP in an SIB1 or a new reduced capability terminal-specific SIB is provided, an initial bandwidth part may be determined by an initial bandwidth part configuration provided by the reduced capability terminal-specific initialDownlinkBWP.

If the bandwidth of an initial bandwidth part provided by initialDownlinkBWP in an SIB1 to the reduced capability terminal is smaller than 20 MHz in a case of a serving cell at FR1 or is smaller than 100 MHz in a case of a serving cell at FR2, and a reduced capability terminal-specific initialDownlinkBWP in an SIB1 or a new reduced capability terminal-specific SIB is not provided, an initial bandwidth part may be determined by an initial bandwidth part configuration obtained by common initialDownlinkBWP provided in the SIB1.

If the bandwidth of an initial bandwidth part provided by initialDownlinkBWP in an SIB1 to the reduced capability terminal is smaller than 20 MHz in a case of a serving cell at FR1 or is smaller than 100 MHz in a case of a serving cell at FR2, and a reduced capability terminal-specific initialDownlinkBWP in an SIB1 or a new reduced capability terminal-specific SIB is provided, an initial bandwidth part may be determined by an initial bandwidth part configuration provided by the reduced capability terminal-specific initialDownlinkBWP.

The initialDownlinkBWP indicates reduced capability terminal-specific initial bandwidth part configuration information, and the above method is applicable even when a transmission to a reduced capability terminal is performed through a means other than an SIB1 or a new reduced capability terminal-specific SIB.

Next, quasi-co-located (QCL) required to be assumed for a reduced capability terminal to monitor a control resource set #0 in a reduced capability terminal-specific initial bandwidth part or receive a PDCCH in the control resource set #0 by using the method provided above will be described.

In the first method, the reduced capability terminal may assume, so as to receive a PDCCH in a reduced capability terminal-specific control resource set #0, and a PDSCH scheduled by the PDCCH, that a DM-RS antenna port associated with PDCCH reception and a DM-RS antenna port associated with corresponding PDSCH reception are QCLed with a common control resource set #0 received by the reduced capability terminal or a synchronization signal block received at the time of initial cell access in relation to at least one property among an average gain, QCL-TypeA, and QCL-TypeD. This method may be applied when a reduced capability terminal-specific control resource set #0 and a common control resource set #0 are positioned on the same resource in the time domain.

In the second method, the reduced capability terminal may receive available QCL information included in an SIB1 or a reduced capability terminal-specific SIB so as to receive a PDCCH in a reduced capability terminal-specific control resource set #0, and a PDSCH scheduled in the PDCCH. The QCL information may include at least one of a particular serving cell ID, the index of an SSB received in the serving cell, and a qcl type {one of typeA, typeB, typeC, and typeD}.

In the third method, when a reduced capability terminal-specific control resource set #0 is positioned in a time resource different from that of a common control resource set #0, the reduced capability terminal may assume that an additional synchronization signal block exists in a different frequency region in the time resource of the reduced capability terminal-specific control resource set #0, and thus the reduced capability terminal has received a synchronization signal block. Alternatively, an SIB1 or a reduced capability terminal-specific SIB may include at least one of pieces of information on a time, a frequency, and a cell ID for reception of the additional synchronization signal block. In this case, the terminal may receive an additional synchronization signal block, based on the information. The additional synchronization signal block may be a synchronization signal block different from a synchronization signal block having been received by the reduced capability terminal at the time of initial cell access. The cell IDs indicated by the two synchronization signal blocks may be the same, and the indexes of the two synchronization signal blocks may be different from each other.

The reduced capability terminal may assume, so as to receive a PDCCH in a reduced capability terminal-specific control resource set #0 and a PDSCH scheduled by the PDCCH, that a DM-RS antenna port associated with PDCCH reception and a DM-RS antenna port associated with corresponding PDSCH reception are QCLed with the additional synchronization signal block received by the reduced capability terminal in relation to at least one property among an average gain, QCL-TypeA, and QCL-TypeD. If an additional synchronization signal block does not exist in the time resource, the reduced capability terminal has failed to receive the additional synchronization signal block, or the SIB1 or the reduced capability terminal-specific SIB does not include information for reception of the additional synchronization signal block, the reduced capability terminal may apply the first method.

In the fourth method, a synchronization signal block may always be transmitted in a reduced capability terminal-specific initial bandwidth part, and the reduced capability terminal assumes to be able to receive the additional synchronization signal block. Alternatively, an SIB1 or a reduced capability terminal-specific SIB may include at least one of pieces of information on a time, a frequency, and a cell ID for reception of the additional synchronization signal block. The additional synchronization signal block may exist in a common initial bandwidth part, and may be different from a synchronization signal block having already been received by a reduced capability terminal. The cell IDs indicated by the two synchronization signal blocks may be the same, and the indexes of the two synchronization signal blocks may be different from each other.

The reduced capability terminal may assume, so as to receive a PDCCH in a reduced capability terminal-specific control resource set #0, and a PDSCH scheduled by the PDCCH, that a DM-RS antenna port associated with PDCCH reception and a DM-RS antenna port associated with corresponding PDSCH reception are QCLed with the additional synchronization signal block received by the reduced capability terminal in relation to at least one property among an average gain, QCL-TypeA, and QCL-TypeD. If the additional synchronization signal block does not exist, the reduced capability terminal has failed to receive the additional synchronization signal block, or the SIB1 or the reduced capability terminal-specific SIB does not include information for reception of the additional synchronization signal block, the first method may be applied.

Figure 8:
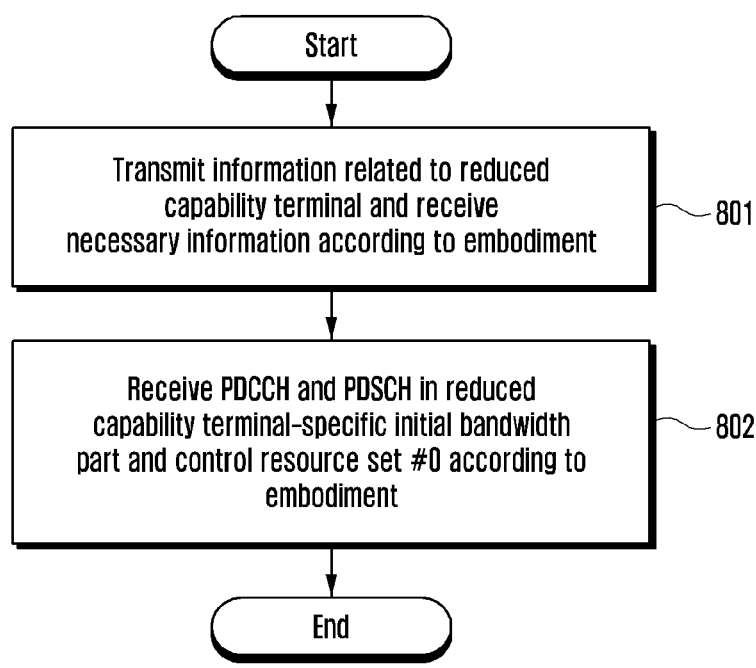
FIG. 8 illustrates a reduced capability terminal procedure in a wireless communication system according to various embodiments of the present disclosure.

FIG. 8 illustrates a reduced capability terminal procedure in a wireless communication system according to various embodiments of the present disclosure.

In operation 801 of FIG. 8, a reduced capability terminal receives, from a base station, at least one of information required to receive a common initial bandwidth part and control resource set #0 and a reduced capability terminal-specific initial bandwidth part and control resource set #0, information for reduced capability terminal random access, TDD or FDD cell information, resource information on a configuration-based downlink signal or a configuration-based uplink signal, and full-duplex communication or half-duplex communication configuration information. The configuration information may be provided to the terminal through an SIB, RRC information, or DCI. In addition, the reduced capability terminal may transmit, to the base station, capability information on the reduced capability terminal, including whether full-duplex communication or half-duplex communication is supported. In operation 802, the reduced capability terminal receives information on a common initial bandwidth part and control resource set #0 and a reduced capability terminal-specific initial bandwidth part and control resource set #0 according to embodiments, based on the information received from the base station, and receives a PDCCH and a PDSCH in the reduced capability terminal-specific initial bandwidth part and control resource set #0.

Alternatively/in addition, the reduced capability terminal may assume a QCL relation in the reduced capability terminal-specific initial bandwidth part according to the method described above. For example, the reduced capability terminal may receive information on an additional synchronization signal block, and in a case where an additional synchronization signal block exists, may assume that a DM-RS antenna port associated with PDCCH reception and a DM-RS antenna port associated with corresponding PDSCH reception are QCLed with the additional synchronization signal block at the time of the PDCCH and/or PDSCH reception.

Figure 9:
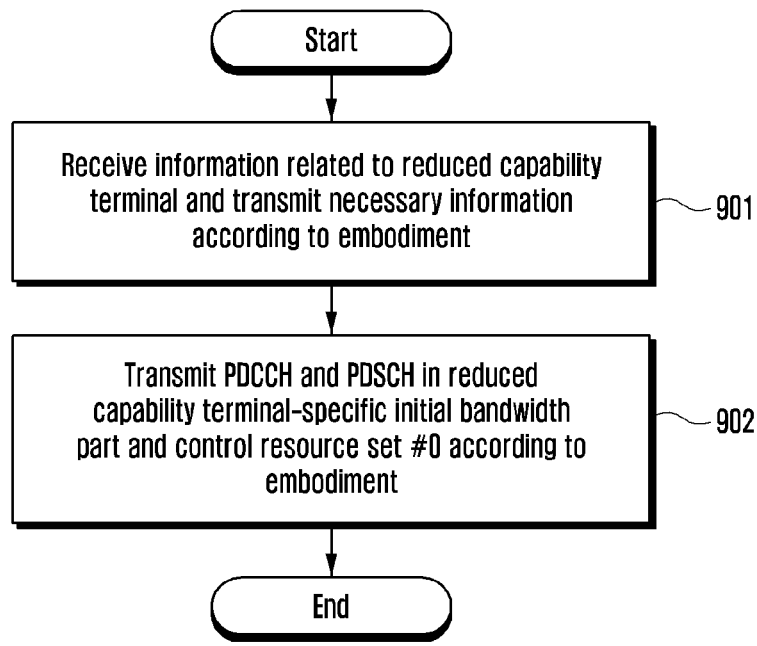
FIG. 9 illustrates a base station procedure in a wireless communication system according to various embodiments of the present disclosure.

FIG. 9 illustrates a base station procedure in a wireless communication system according to various embodiments of the present disclosure. In operation 901 of FIG. 9, a base station transmits, to a reduced capability terminal, at least one of information required to receive a common initial bandwidth part and control resource set #0 and a reduced capability terminal-specific initial bandwidth part and control resource set #0, information for reduced capability terminal random access, TDD or FDD cell information, resource information on a configuration-based downlink signal or a configuration-based uplink signal, and full-duplex communication or half-duplex communication configuration information. The configuration information may be provided to the terminal through an SIB, RRC information, or DCI. In addition, the base station may transmit information on a common initial bandwidth part and control resource set #0 and a reduced capability terminal-specific initial bandwidth part and control resource set #0 according to embodiments and, in operation 902, may transmit a PDCCH and a PDSCH in the reduced capability terminal-specific initial bandwidth part and control resource set #0.

Alternatively/in addition, the base station may transmit a PDCCH and/or a PDSCH in consideration of a QCL relation in the reduced capability terminal-specific initial bandwidth part according to the method described above. For example, the base station may transmit information for reception of information on an additional synchronization signal block, and transmit an additional synchronization signal block. The reduced capability terminal may assume that a DM-RS antenna port associated with PDCCH reception and a DM-RS antenna port associated with corresponding PDSCH reception are QCLed with the additional synchronization signal block at the time of the PDCCH and/or PDSCH reception.

Figure 10:
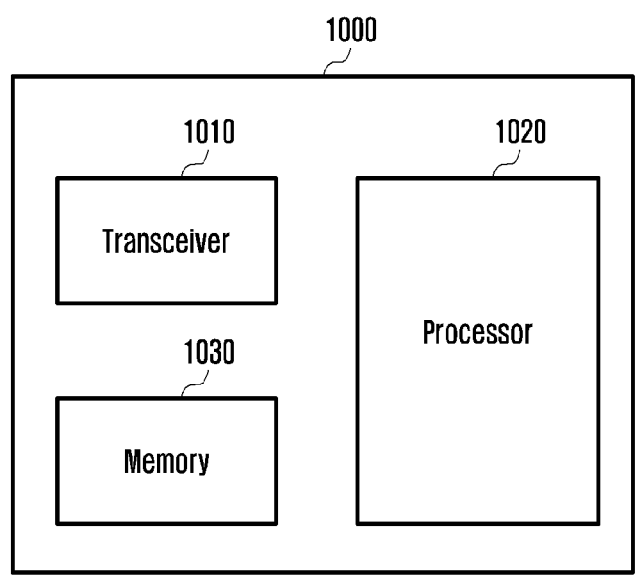
FIG. 10 illustrates a block diagram of a terminal according to various embodiments of the present disclosure.

FIG. 10 illustrates a block diagram illustrating a configuration of a normal terminal or a reduced capability terminal performing an operation according to various embodiments of the present disclosure.

Referring to FIG. 10, a terminal 1000 may include a transceiver 1010, a processor 1020, and a memory 1030. The terminal 1000 according to the disclosure may operate according to a scheme described in the embodiments of FIG. 7 in a wireless communication system to which the disclosure is applied as described above with reference to FIG. 1 to FIG. 6. However, the elements of the terminal 1000 according to an embodiment are not limited to the above example. According to another embodiment, the terminal 1000 may include more elements than the above elements, and may also include fewer elements in a case of a reduced capability terminal. In addition, in a particular case, the transceiver 1010, the processor 1020, and the memory 1030 may be implemented in a single chip type.

The transceiver 1010 may also be configured by a transmitter and a receiver according to another embodiment. The transceiver 1010 may transmit or receive a signal to or from a base station. The signal may include control information and data. To this end, the transceiver 1010 may include an RF transmitter that up-converts and amplifies a frequency of a transmitted signal, and an RF receiver that low-noise amplifies a received signal and down-converts the frequency. In addition, the transceiver 1010 may receive a signal through a wireless channel and output the signal to the processor 1020, and may transmit a signal output from the processor 1020, through a wireless channel.

The processor 1020 may control a series of processes allowing the terminal 1000 to operate according to an embodiment described above.

The memory 1030 may store control information or data such as a transmission resource configuration included in a signal obtained by the terminal 1000, and may have a region for storing data required for control of the processor 1020, and data generated at the time of control by the processor 1020.

Figure 11:
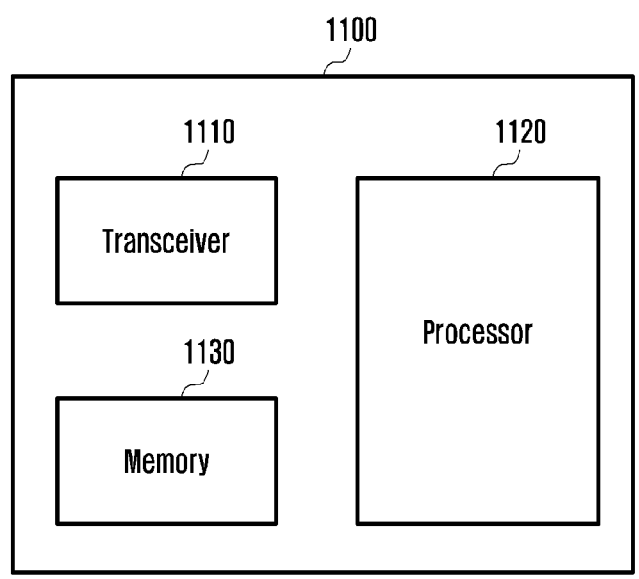
FIG. 11 illustrates a block diagram of a base station according to various embodiments of the present disclosure.

FIG. 11 illustrates a block diagram illustrating a configuration of a base station performing an operation according to various embodiments of the present disclosure.

Referring to FIG. 11, a base station 1100 may include a transceiver 1110, a processor 1120, and a memory 1130. The base station 1100 according to the disclosure may operate according to a scheme described in the embodiments of FIG. 7 in a wireless communication system to which the disclosure is applied as described with reference to FIG. 1 to FIG. 6. However, the elements of the base station 1100 according to an embodiment are not limited to the above example. According to another embodiment, the base station 1100 may also include more or fewer elements than the above elements. In addition, in a particular case, the transceiver 1110, the processor 1120, and the memory 1130 may be implemented in a single chip type. The transceiver 1110 may also be configured by a transmitter and a receiver according to another embodiment. The transceiver 1110 may transmit or receive a signal to or from a terminal. The signal may include control information and data. To this end, the transceiver 1110 may include an RF transmitter that up-converts and amplifies a frequency of a transmitted signal, and an RF receiver that low-noise amplifies a received signal and down-converts the frequency. In addition, the transceiver 1110 may receive a signal through a wireless channel and output the signal to the processor 1120, and may transmit a signal output from the processor 1120, through a wireless channel.

The processor 1120 may control a series of processes so that the base station 1100 may operate according to an embodiment described above. The memory 1130 may store control information or data such as a transmission resource configuration determined by the base station 1100, or control information or data received from a terminal, and may have a region for storing data required for control of the processor 1120, and data generated at the time of control by the processor 1120.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a reduced capability (redcap) terminal in a wireless communication system, the method comprising:
receiving, from a base station, configuration information on a downlink bandwidth part (BWP) via higher layer signaling;
identifying whether the configuration information includes information on an additional synchronization signal block (SSB) related to the redcap terminal; and
in case that the configuration information includes the information on the additional SSB, receiving, from the base station, one or more additional SSBs, wherein the additional SSB is quasi co-located (QCLed) with at least one of a demodulation reference signal (DMRS) port of a physical downlink control channel (PDCCH) or a DMRS port of a physical downlink shared channel (PDSCH),
wherein in case that the configuration information does not include the information on the additional SSB, an SSB for an initial access is QCLed with at least one of the DMRS port of the PDCCH or the DMRS port of the PDSCH.

2. The method of claim 1, wherein a cell identity identified from the additional SSB is the same as a cell identity identified from the SSB for the initial access to the base station.

3. The method of claim 1, further comprising:
wherein the information on the additional SSB includes frequency location information and timing information for the additional SSB.

4. The method of claim 1, wherein the additional SSB is used by the redcap terminal in an initial BWP for the redcap terminal.

5. The method of claim 4, wherein information on the initial BWP for the redcap terminal includes information on a frequency location of the initial BWP for the redcap terminal, subcarrier spacing information and cyclic prefix information of the initial BWP for the redcap terminal.

6. A method performed by a base station supporting a reduced capability (redcap) terminal in a wireless communication system, the method comprising:
transmitting, to the redcap terminal, configuration information on a downlink bandwidth part (BWP) via higher layer signaling; and
in case that the configuration information includes information on an additional synchronization signal block (SSB) related to the redcap terminal, transmitting, to the redcap terminal, one or more additional SSBs, wherein the additional SSB is quasi co-located (QCLed) with at least one of a demodulation reference signal (DMRS) port of a physical downlink control channel (PDCCH) or a DMRS port of a physical downlink shared channel (PDSCH),
wherein in case that the configuration information does not include the information on the additional SSB, an SSB for an initial access is QCLed with at least one of the DMRS port of the PDCCH or the DMRS port of the PDSCH.

7. The method of claim 6,
wherein a cell identity associated with the additional SSB is the same as a cell identity associated with the SSB for the initial access to the base station.

8. The method of claim 6,
wherein the information on the additional SSB includes frequency location information and timing information for the additional SSB.

9. The method of claim 6, wherein the additional SSB is used by the redcap terminal in an initial BWP for the redcap terminal.

10. The method of claim 9, wherein information on the initial BWP for the redcap terminal includes information on a frequency location of the initial BWP for the redcap terminal, subcarrier spacing information and cyclic prefix information of the initial BWP for the redcap terminal.

11. A reduced capability (redcap) terminal in a wireless communication system, the redcap terminal comprising:
a transceiver; and
a controller coupled with the transceiver and configured to:
receive, from a base station, configuration information on a downlink bandwidth part (BWP) via higher layer signaling,
identify whether the configuration information includes information on an additional synchronization signal block (SSB) related to the redcap terminal, and
in case that the configuration information includes the information on the additional SSB, receive, from the base station, one or more additional SSBs, wherein the additional SSB is quasi co-located (QCLed) with at least one of a demodulation reference signal (DMRS) port of a physical downlink control channel (PDCCH) or a DMRS port of a physical downlink shared channel (PDSCH),
wherein in case that the configuration information does not include the information on the additional SSB, an SSB for an initial access is QCLed with at least one of the DMRS port of the PDCCH or the DMRS port of the PDSCH.

12. The redcap terminal of claim 11, wherein a cell identity identified from the additional SSB is the same as a cell identity identified from the SSB for the initial access to the base station.

13. The redcap terminal of claim 11,
wherein the information on the additional SSB includes frequency location information and timing information for the additional SSB.

14. The redcap terminal of claim 11, wherein the additional SSB is used by the redcap terminal in an initial BWP for the redcap terminal.

15. The redcap terminal of claim 14, wherein information on the initial BWP for the redcap terminal includes information on a frequency location of the initial BWP for the redcap terminal, subcarrier spacing information and cyclic prefix information of the initial BWP for the redcap terminal.

16. A base station supporting a reduced capability (redcap) terminal in a wireless communication system, the base station comprising:
a transceiver; and
a controller coupled with the transceiver and configured to:
transmit, to the redcap terminal, configuration information on a downlink bandwidth part (BWP) via higher layer signaling, and
in case that the configuration information includes information on an additional synchronization signal block (SSB) related to the redcap terminal, transmit, to the redcap terminal, one or more additional SSBs, wherein the additional SSB is quasi co-located (QCLed) with at least one of a demodulation reference signal (DMRS) port of a physical downlink control channel (PDCCH) or a DMRS port of a physical downlink shared channel (PDSCH),
wherein in case that the configuration information does not include the information on the additional SSB, an SSB for an initial access is QCLed with at least one of the DMRS port of the PDCCH or the DMRS port of the PDSCH.

17. The base station of claim 16, wherein a cell identity associated with the additional SSB is the same as a cell identity associated with the SSB for the initial access to the base station.

18. The base station of claim 16,
wherein the information on the additional SSB includes frequency location information and timing information for the additional SSB.

19. The base station of claim 16, wherein the additional SSB is used by the redcap terminal in an initial BWP for the redcap terminal.

20. The base station of claim 19, wherein information on the initial BWP for the redcap terminal includes information on a frequency location of the initial BWP for the redcap terminal, subcarrier spacing information and cyclic prefix information of the initial BWP for the redcap terminal.

* * * * *